(12) United States Patent
Chang et al.

(10) Patent No.: US 7,821,231 B1
(45) Date of Patent: Oct. 26, 2010

(54) RECHARGEABLE BATTERY ASSEMBLY AND POWER SYSTEM USING SAME

(76) Inventors: Chun-Chieh Chang, 2250 N. Triphammer Rd., H2E, Ithaca, NY (US) 14850; Tsun-Yu Chang, 231 Chin-hua N. Road, Taichung (TW); Olivia Pei-Hua Lee, 217 Elsmere Pl., Fort Lee, NJ (US) 07024

( * ) Notice: Subject to any disclaimer, the term of this patent is extended or adjusted under 35 U.S.C. 154(b) by 0 days.

(21) Appl. No.: 12/835,064

(22) Filed: Jul. 13, 2010

Related U.S. Application Data

(60) Division of application No. 12/231,920, filed on Sep. 8, 2008, now Pat. No. 7,777,451, which is a continuation-in-part of application No. 11/805,786, filed on May 24, 2007, now Pat. No. 7,782,013.

(60) Provisional application No. 60/923,747, filed on Apr. 17, 2007, provisional application No. 60/930,646, filed on May 18, 2007.

(51) Int. Cl.
*H02J 7/00* (2006.01)
(52) U.S. Cl. ...................................... 320/126; 320/118
(58) Field of Classification Search ....................... None
See application file for complete search history.

*Primary Examiner*—Edward Tso
*Assistant Examiner*—Ramy Ramadan
(74) *Attorney, Agent, or Firm*—Kratz, Quintos & Hanson, LLP

(57) ABSTRACT

A rechargeable battery, battery set or battery pack having a circuit or a plurality of circuits for providing self-discharging thereof electrically connected in parallel are used to form rechargeable battery assemblies and electric power supply systems for use in electric and hybrid vehicles and the like.

3 Claims, 24 Drawing Sheets

RECHARGEABLE BATTERY ASSEMBLY AND POWER SYSTEM USING SAME

This application is a Divisional Application of U.S. application Ser. No. 12/231,920 filed Sep. 8, 2008 now U.S. Pat. No. 7,777,451, which is a continuation-in-part of U.S. application Ser. No. 11/805,786, filed May 24, 2007 now U.S. Pat. No. 7,782,013, which claims priority of U.S. Provisional Applications 60/923,747 filed Apr. 17, 2007 and 60/930,646 filed May 18, 2007.

FIELD OF INVENTION

The present invention is concerned with rechargeable batteries, and in particular with the recharging of rechargeable batteries.

BACKGROUND OF THE INVENTION

1. For batteries to be used for applications such as vehicle starter, electric bikes, electric motorcycles, electric or hybrid vehicles, etc, high voltage is essential owing to the increase of efficiency and the decrease of cost. The increase of voltage requires batteries to be connected in series.
2. Problems associated with batteries in series are:
   a. when one battery has a lower capacity, the capacity of the overall set of batteries is dictated by the capacity of the battery of lower capacity;
   b. if the battery possessing the lower capacity can not be charged to full capacity during charging, the performance of the entire battery set will be degraded owing to the lower capacity battery. This is known in the art as cell imbalance;
   c. the lower capacity of one specific battery can be caused by either high self discharge or defects during battery production.
3. Conventional ways to solve the cell imbalance problem are:
   a. sorting the batteries in order to avoid inconsistency of the batteries to be connected in series;
   b. charging the batteries separately (e.g. U.S. Pat. No. 6,586,909), in order to overcome the problems mentioned above, however, low voltage is required for charging each battery to full (for example, the lithium iron battery is charged to 3.65V) and this low voltage charging is not energy efficient owing to conversions from normal high voltage AC power source to low voltage DC power.

Most prior art systems and methods utilized in making the batteries balanced during charging use complicated circuitry to detect and balance the uncharged batteries (e.g. U.S. Pat. No. 7,068,011, U.S. Pat. No. 7,061,207, U.S. Pat. No. 6,882,129, U.S. Pat. No. 6,841,971, U.S. Pat. No. 6,825,638, U.S. Pat. No. 6,801,014, U.S. Pat. No. 6,784,638, U.S. Pat. No. 6,777,908, U.S. Pat. No. 6,700,350, U.S. Pat. No. 6,642,693, U.S. Pat. No. 6,586,909, U.S. Pat. No. 6,511,764, U.S. Pat. No. 6,271,645).

OBJECT OF THE INVENTION

It is an object of the present invention to provide a simple device and method for charging a plurality of batteries electrically connected in a series circuit.

SUMMARY OF THE INVENTION

The present invention is a rechargeable battery assembly, having a rechargeable battery with a positive terminal and a negative terminal, and means for self-discharging the rechargeable battery when a voltage across the terminals is greater or equal to a preset value. The means for self-discharging is electrically connected in parallel with the battery terminals

DESCRIPTION OF THE DRAWINGS

The invention will become more readily apparent from the following description thereof shown, by way of example only, in the accompanying drawings, wherein.

DETAILED DESCRIPTION OF THE INVENTION

The present invention is especially important for resolving the problems caused by batteries connected in series. A cell imbalance problem during charging can be alleviated by creating a device and methods that allows the leakage of current (energy) from the batteries being overcharged. Instead of using very expensive devices or ways to prevent overcharging, to achieve battery equalization, as found in prior art devices and methods, the present invention uses a method and device that reduces the current being provided to a battery in the series circuit that is being overcharged. Such method and device can be implemented for each battery or battery set or battery pack being connected in series. The terminology "battery set" used throughout the specification means a plurality of batteries connected in parallel, or series, or parallel-series, or series-parallel. The terminology "battery pack" used throughout the specification means a plurality of battery sets connected in parallel, or series, or parallel-series, or series-parallel. The terminology "assembly" used throughout the specification means a battery, a battery set, or a battery pack accompanied with a means for self-discharge of the battery(s), battery set or battery pack when the battery(s) is(are) being overcharged In the present invention a battery or batteries self-discharge when overcharged. Since each battery, battery set, or battery pack are provided with a "self-discharge" means, when voltage reaches a preset parameter during charging, or even after charging, a cell balance problem can be eliminated. This is the core idea of the present invention.

Figure 1A:
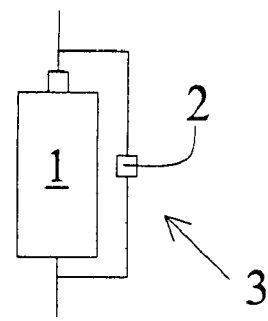
FIGS. 1a-e are schematic illustrations of various embodiments of battery assemblies of the invention.
Figure 1B:
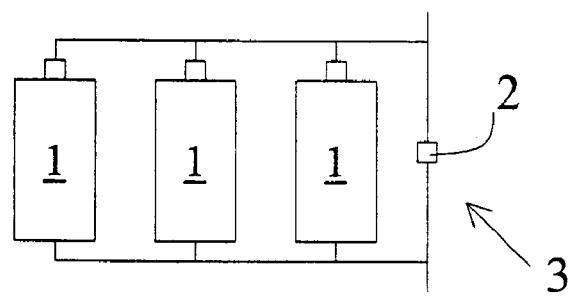
Figure 1C:
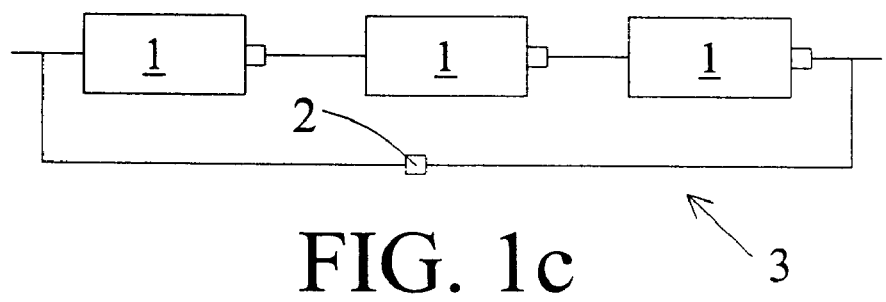
Figure 1D:
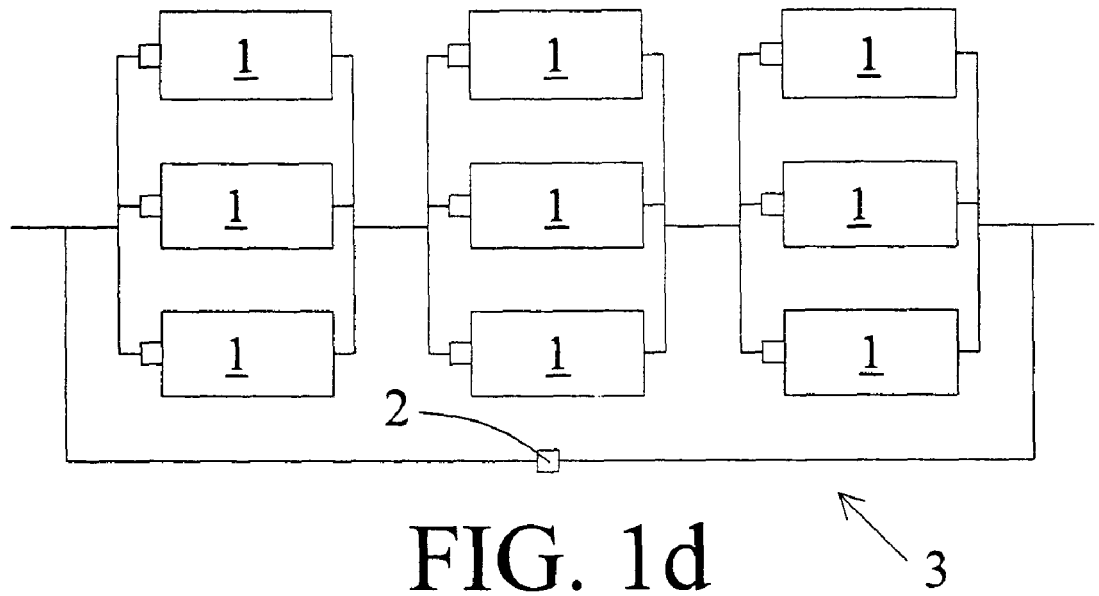
Figure 1E:
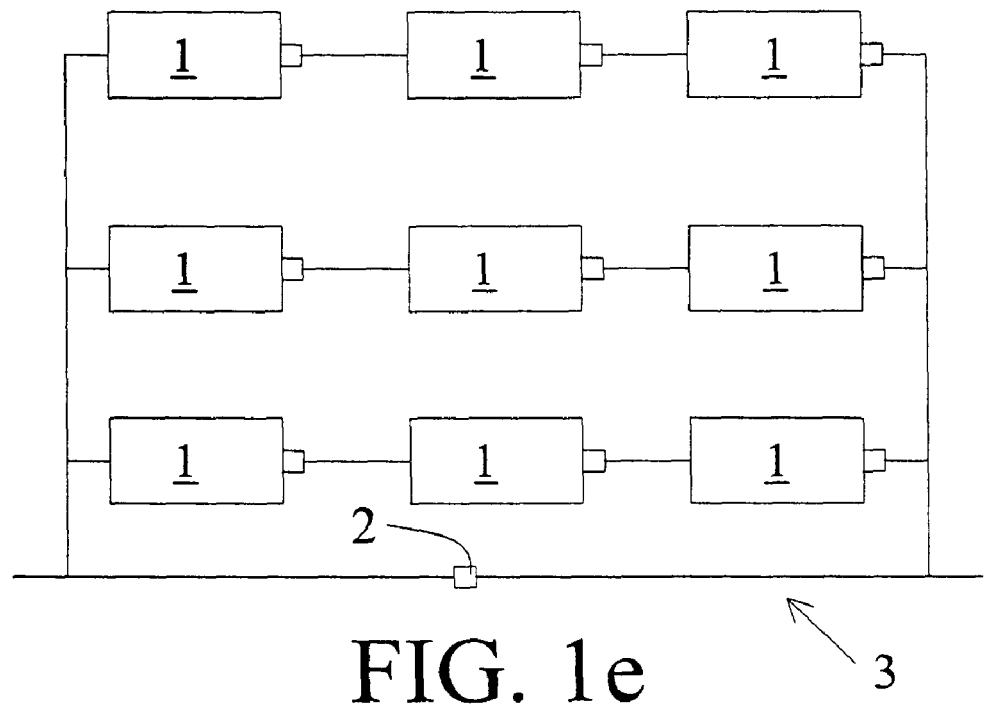

FIG. 1(a) shows the structure of a "battery assembly". FIG. 1(b) shows the structure of a "parallel battery set assembly"; FIG. 1(c) shows the structure of a "series battery set assembly"; FIG. 1(d) shows the structure of a "parallel-series battery set assembly"; and FIG. 1(e) shows the structure of a "series-parallel battery set assembly". These assemblies are the basic units for use in providing the battery pack. In these figures, as well as in the remaining figures, an individual rechargeable battery is indicated at 1, and a circuit for self-discharging the rechargeable battery(s) is indicated at 3.

Figure 2A:
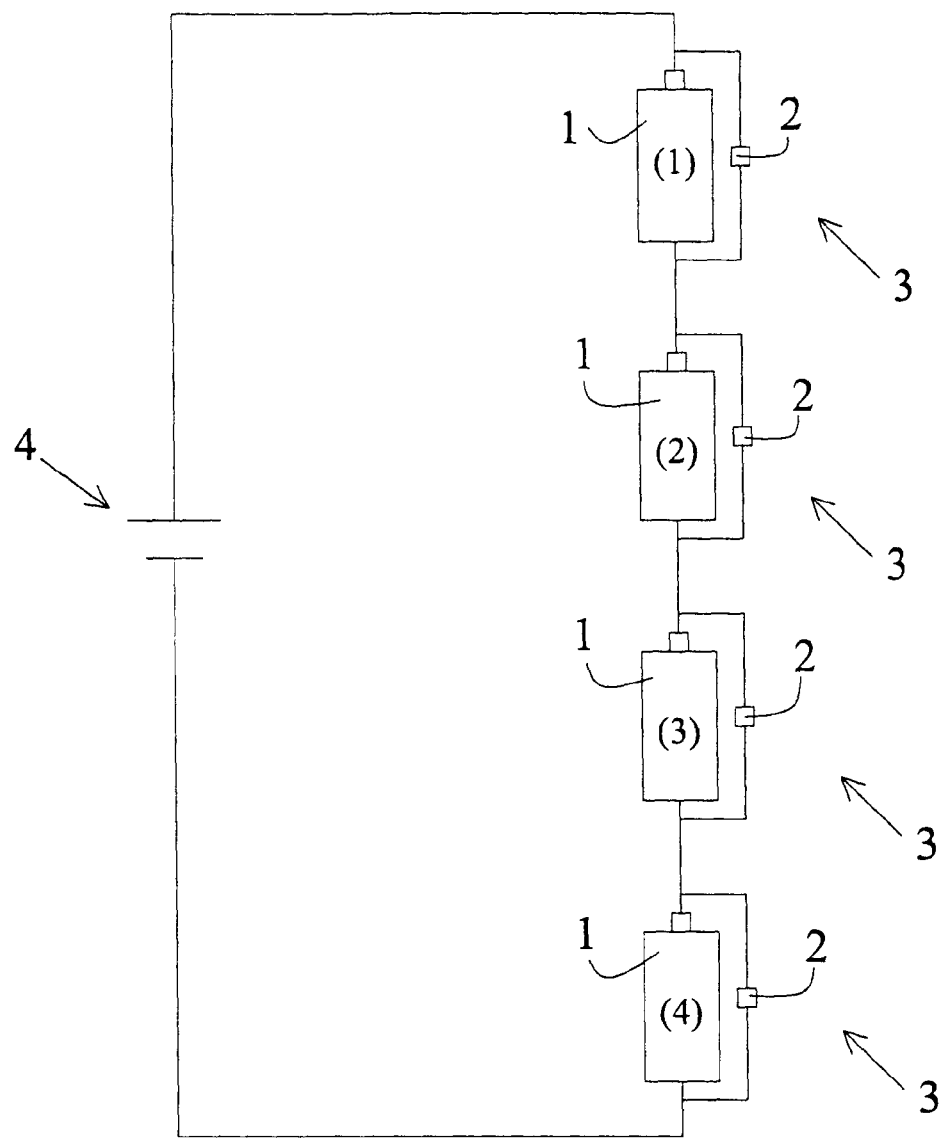
FIG. 2a is a schematic illustration of a battery assembly of the invention with an enlarged drawing of a self-discharging circuit of the invention.
Figure 2A:
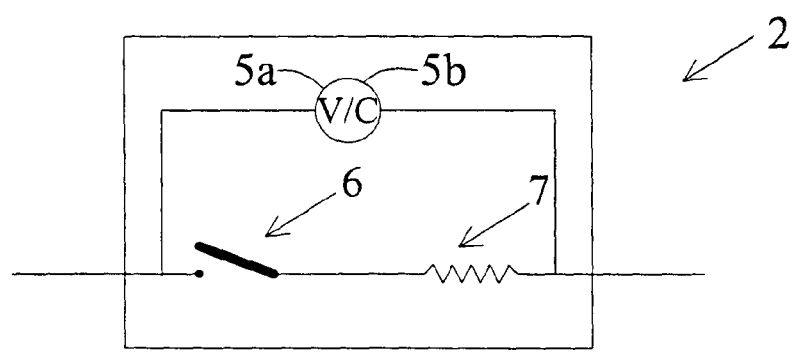
Figure 2B:
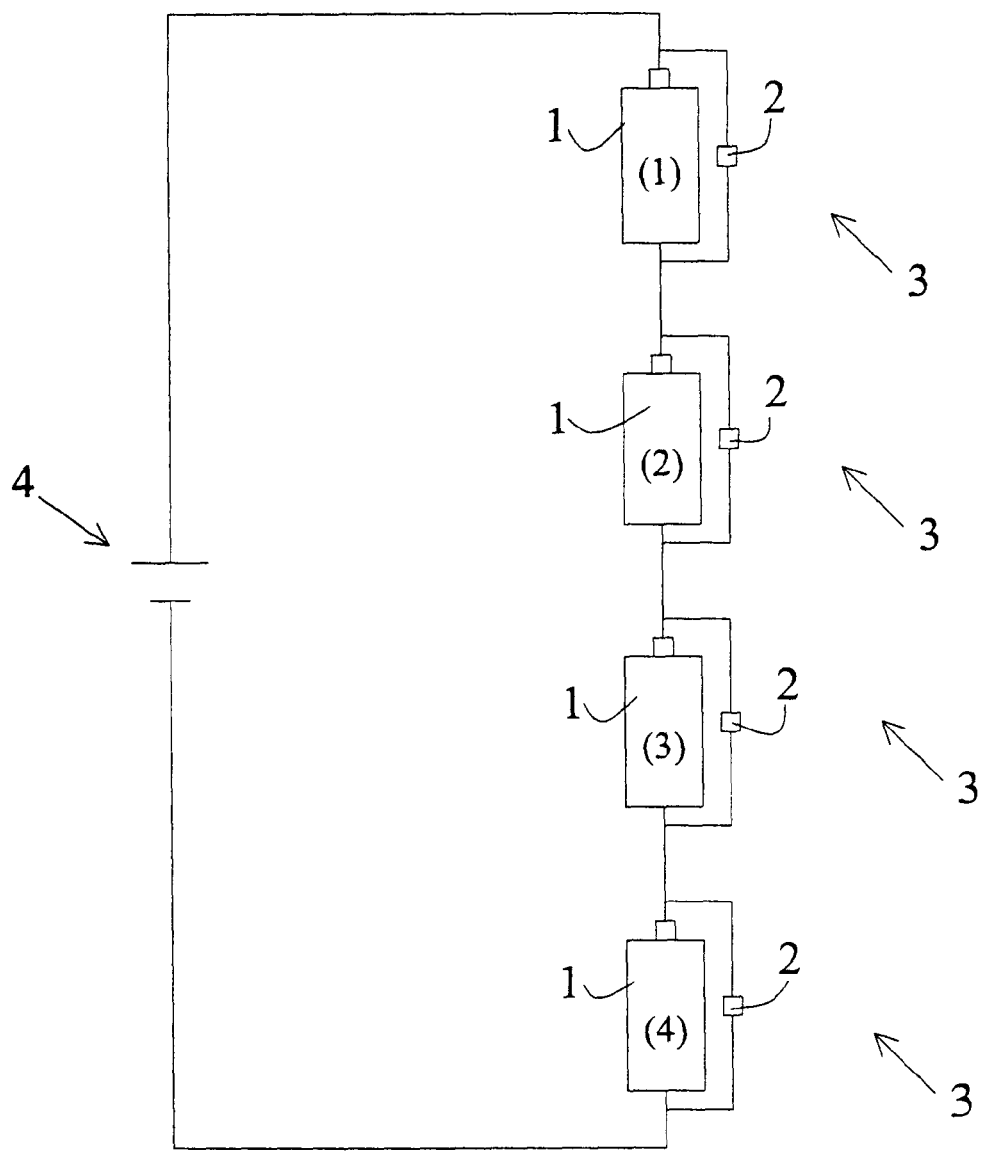
FIG. 2b is a schematic illustration the battery assembly of the invention with an enlarged drawing of another embodiment of a self-discharging circuit of the invention.
Figure 2B:
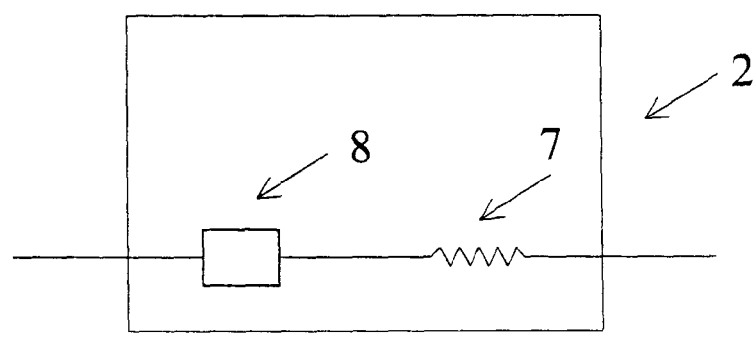

The present method of solving the cell imbalance problem is shown in FIG. 2(a). As indicated in FIG. 2(a), each battery is connected with a device 2 in parallel with the battery. Such device is comprised of a switching element 6, a resistance element 7, a voltage-detecting element 5a, and a switching element controller 5b that opens or closes the switching element 6. The voltage-detecting element detects the voltage of the battery and along with the switching element controller controls the "opened" or "closed" state of the switching element. The switching element, resistance element, voltage-detecting element and switching element controller can be disposed on a printed circuit board. However, since a transistor can function as a combination of a voltage-detecting element, controller, switching element, and a resistance element, the device shown in FIG. 2(a) can be replaced by a transistor, or a plurality of transistors connected in parallel (for adjusting the resistance). Other possibilities are one transistor 8 connected with a resistor 7 in series as shown in FIG. 2(b). In the case of the transistor and resistor connected in series as indicated in FIG. 2(b), the resistance of the resistor should be small in order to minimize the voltage drop caused by the resistor thus affecting the voltage detection of the transistor. The configuration of FIG. 2(b) can also be applicable to diodes such as LEDs, or a printed circuit board consisting of the switching element and the controller only.

When batteries are charged, if the voltage of one of the batteries is above a preset upper limit, the switching element of the device electrically connected in parallel to the battery closes, therefore allowing current to flow through the resistor. Thus, the charging current for the battery that passed the preset upper limit voltage decreases, due to the presence of the device connected in parallel to the battery. Such decrease is shown in Example 1, below. Under such condition, other batteries are charged in a normal current flow but the one that passed the upper voltage limit has a decreased charging action. This is a basic mechanism of the invention for the prevention of battery overcharging. It should be mentioned that the resistance element can be any electronic component that possesses a satisfactory resistance. For example, a light bulb can be used as a source of resistance.

Figure 3:
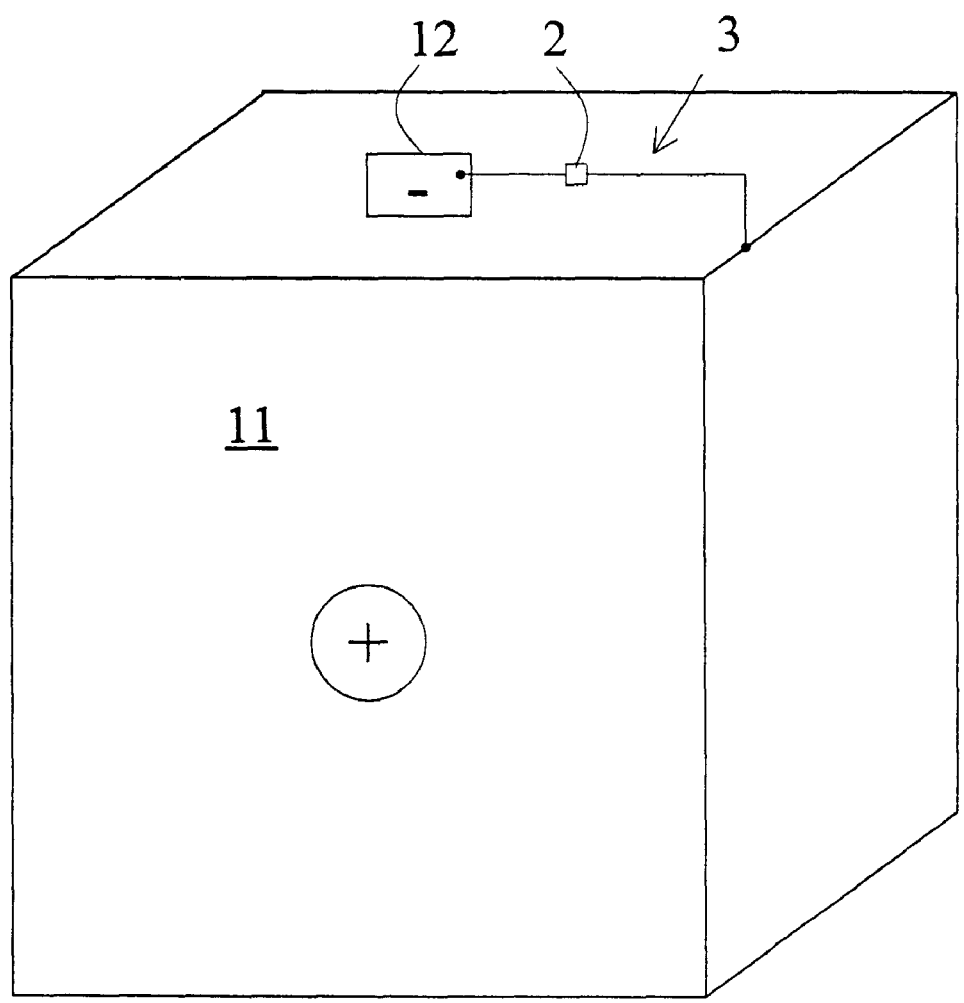
FIG. 3 is a schematic illustration of the battery assembly of the invention having the self-discharging circuit disposed on a case of the battery.

The elements of the device can be on a semiconductor chip 2, which can be disposed anywhere close to the battery. FIG. 3 shows one possibility of the semiconductor chip 2 being built-in on the lid of a case of a battery. Also, for example, the chip can be disposed between the cathode (the case) 11 and the anode (the negative terminal) 12. Also, the chip can be placed inside the battery case.

The resistor can be a variable one if further precise control of the resistance is necessary. Details of the current change for each battery during charging are further described below:

Example 1

Theoretical Demonstration of how Cell Equalization can be Achieved

Assumptions:
1. Four battery assemblies are connected in series as indicated in FIG. 2(a).
2. Batteries (1), (3), (4) have internal resistance of 5 mOhm, battery (2) has an internal resistance of 10 mOhm.
3. Batteries (1), (3), (4) have open circuit voltage of 3.3V, battery (2) has an open circuit voltage of 3.6V.
4. For each battery assembly, a resistor of 1.0 Ohm is connected parallel to the battery.
5. A power supply of 15V is applied to the four battery assemblies connected in series.

Calculation Case 1 (when Paralleled Resistors are all Open):

During charging of the four battery assemblies, the voltage of each battery can be represented as:

Battery (1): $V_1=Vo_1+I_1R_1$, $V_1$ is the voltage of the battery (1) during charging, $Vo_1$ is the open circuit voltage of battery (1), $I_1$ is the current passing through battery (1) and $R_1$ is the internal resistance of the battery (1).

Battery (2): $V_2=Vo_2+I_2R_2$,

Battery (3): $V_3=Vo_3+I_3R_3$,

Battery (4): $V_4=Vo_4+I_4R_4$,

Since no other resistors are connected, $I_1=I_2=I_3=I_4=I$ $15=(V_1+V_2+V_3+V_4)=(Vo_1+Vo_2+Vo_3+Vo_4)+I(R_1+R_2+R_3+R_4)$ $15-(Vo_1+Vo_2+Vo_3+Vo_4)=I(R_1+R_2+R_3+R_4)$ $15-3.3-3.6-3.3-3.3=I(0.005+0.01+0.005+0.005)$ I=60 Amp—The current that passes through each battery Calculation Case 2, (when the Paralleled Resistor Circuit is Closed for Battery (2)):

Assume I' is the current passing through the resistor and R' is the resistance of the resistor. Then, $V_2=I'R'$, $I'=V_2/R'$ $V_2=Vo_2+I_2R_2$, Considering the current balance: $(I'+I_2)=I_1=I_3=I_4=I$ So, $V_2=Vo_2+(I-I')R_2=Vo_2+(I-V_2/R')R_2$ Rearrange, then we get $V_2=(Vo_2+IR_2)/(1+R_2/R')$ Thus, $$I5=(V_1+V_2+V_3+V_4)=(Vo_1+Vo_3+Vo_4)+I(R_1+R_3+R_4)+(Vo_2+IR_2)/(1+R_2/R')$$

So, $$I=61.672(A),$$

$$V_2=(Vo_2+IR_2)/(1+R_2/R')=4.175(V),$$

$$I'=V_2/R'=4.175(A),$$

$$I_2=I-I'=57.497(A)$$

If we substitute a resistor of 10 Ohm, then $$I=60.168(A),$$

$$V_2=Vo_2+(I-V_2/R')R_2=4.1975(V),$$

$$I'=V_2/R'=0.4198(A),$$

$$I_2=I-I'=59.748(A)$$

Conclusions from the Calculations:
1. With regards to battery assembly of FIG. 2(a), when the switch of the resistor in the parallel circuit is closed, current flows through the resistor, and the charging current for battery (2) is decreased.
2. While the switch of the paralleled resistor circuit is closed for the battery assembly of FIG. 2(a), the charging current for other batteries (1, 3, 4) is increased.
3. The resistance of the resistor dictates the magnitude of the current decrease for battery (2). The smaller the resistance, the bigger the magnitude of current decrease.
4. Thus, the idea of incorporating a resistor with each battery connected in series is effective in balancing the capacity of all batteries by decreasing the charging current of the battery that has a higher capacity, and by increasing the charging current of the other batteries that have a lower capacity.
5. It is clear that the resistor connected in parallel with the battery should possess satisfactory cell balancing function. Any electronic devices or components that satisfy the function of voltage sensing and providing the source of resistance are within the focus of the present invention.

Example 2

Theoretical Calculation Demonstrating a Method of Charging a Battery Assembly

Assumptions

1. Four battery assemblies are connected in series as indicated in FIG. 2(a).
2. Batteries (1), (3), (4) have internal resistance of 5 mOhm, battery (2) has an internal resistance of 10 mOhm.
3. Batteries (1), (3), (4) have open circuit voltage of 3.3V, battery (2) has an open circuit voltage of 3.6V.
4. Batteries (1), (2), (3), and (4) are subjected to a constant current charge. The current is 2 A.
5. For demonstration purpose, the battery being investigated, battery (2), a resistor of 1.0 Ohm is connected parallel to the battery and the circuit switch is closed.

Calculations:

Considering the current balance: $(I'+I_2)=I_1=I_3=I_4=I=2(A)$ $$V_2=Vo_2+(I-I')R_2=Vo_2+(I-V_2/R')R_2$$

Rearrange, then we get $$V_2=(Vo_2+IR_2)/(1+R_2/R')$$

Substituting $Vo_2=3.6(V)$, $I=2(A)$, $R_2=0.01$ Ohm, $R'=1$ Ohm

We get:

$$V_2=3.5842(V)$$

$$I'=V_2/R'=3.5842(A),$$

$$I_2=I-I'=2-3.5842=-1.5842(A)<0$$

Conclusions from the Calculations:
1. The battery that is overcharged will undergo discharging when the circuit current (I) is less than the current that passes the resistor (I'). That is, (I–I'<0).
2. When batteries being overcharged undergo discharge, cell balance can be achieved.
3. By combining the calculation results shown in Example 1 and 2, it can also be concluded that the cell balance charging method can be implemented as either a constant voltage mode (but the charging time required should be longer than the time required for the condition of I<I'), or a constant current mode by passing a current (I) that is less than the current that passes the resistor (I').
4. It can further be concluded that the charger can be designed to have two modes for charging. One mode is the normal constant current/constant voltage charge mode for a battery system's normal use (end of charge executed by setting a certain charging time). The other mode is the cell balance mode (constant current charging) that can be used when a battery system possesses less capacity than their normal use.

Example 3

A Battery Pack and a Battery System

Figure 9:
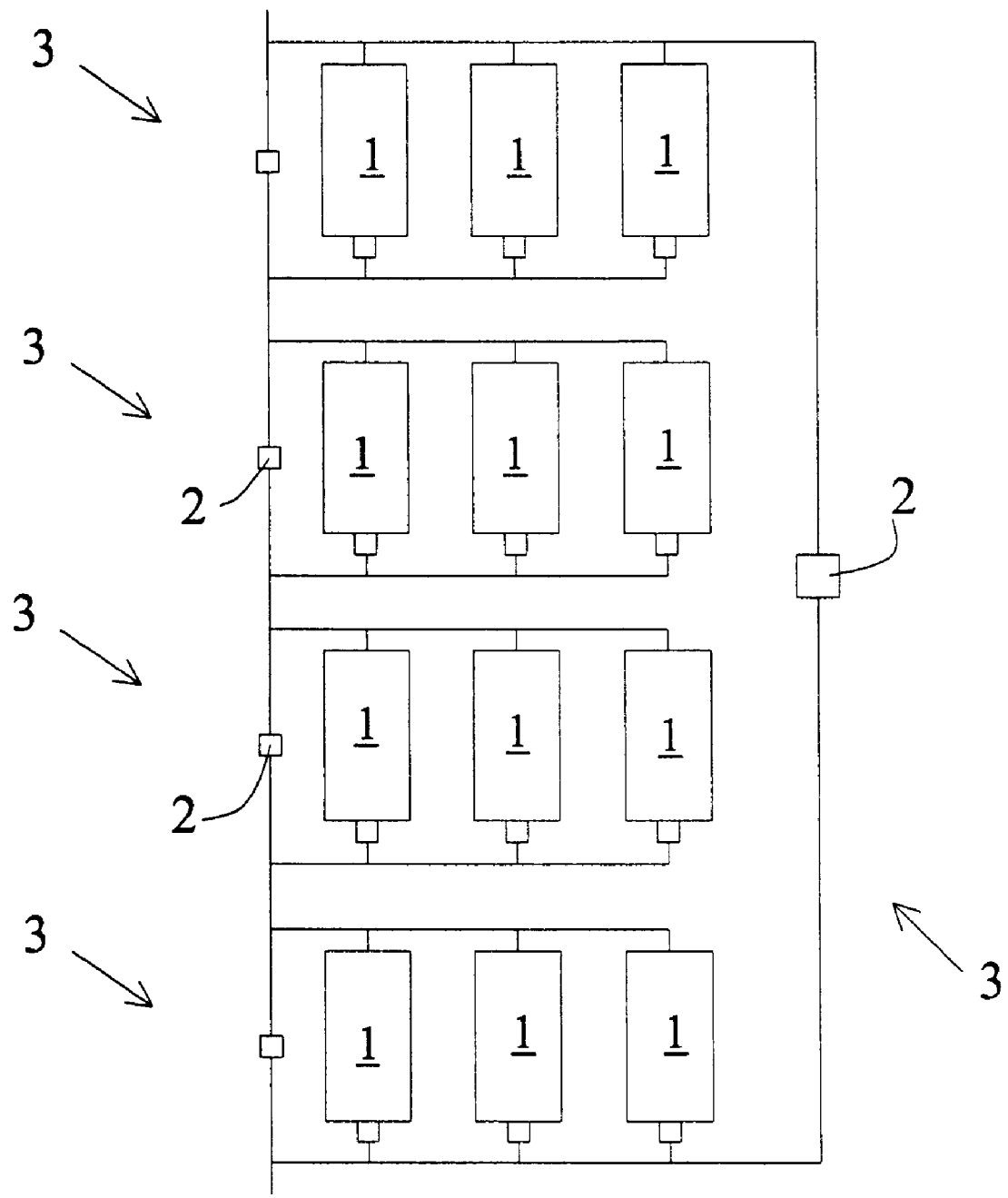
FIG. 9 is a schematic illustration of a battery pack assembly having battery assemblies of the invention.

As mentioned above, a battery pack can be comprised of battery sets, or battery set assemblies as shown in FIG. 1(a)-(e). In the present invention, a battery pack may also connect with a parallel circuit containing a switching element, a voltage-detecting element, a controller, and a resistance element to form a "battery pack assembly". The possible structures of battery packs constructed using battery set assemblies are shown in FIGS. 5(a)-(e), FIGS. 6(a)-(e), FIGS. 7(a)-(e), and FIGS. 8(a)-(e). These figures represent the five unit structures shown in FIGS. 1(a)-(e) being connected in various circuit arrangements. In series (FIGS. 5(a)-(e)), in parallel (FIGS. 6(a)-6(e)), in parallel-series (FIGS. 7(a)-7(e)), and in series-parallel (FIGS. 8(a)-8(e)). Each of the cases shown in FIGS. 5, 6, 7, and 8 can again be combined with a parallel circuit containing the switching element, the controller, the voltage-detecting element and the resistance element to form a "battery pack assembly". An example of a "battery pack assembly" is shown in FIG. 9

Figure 10:
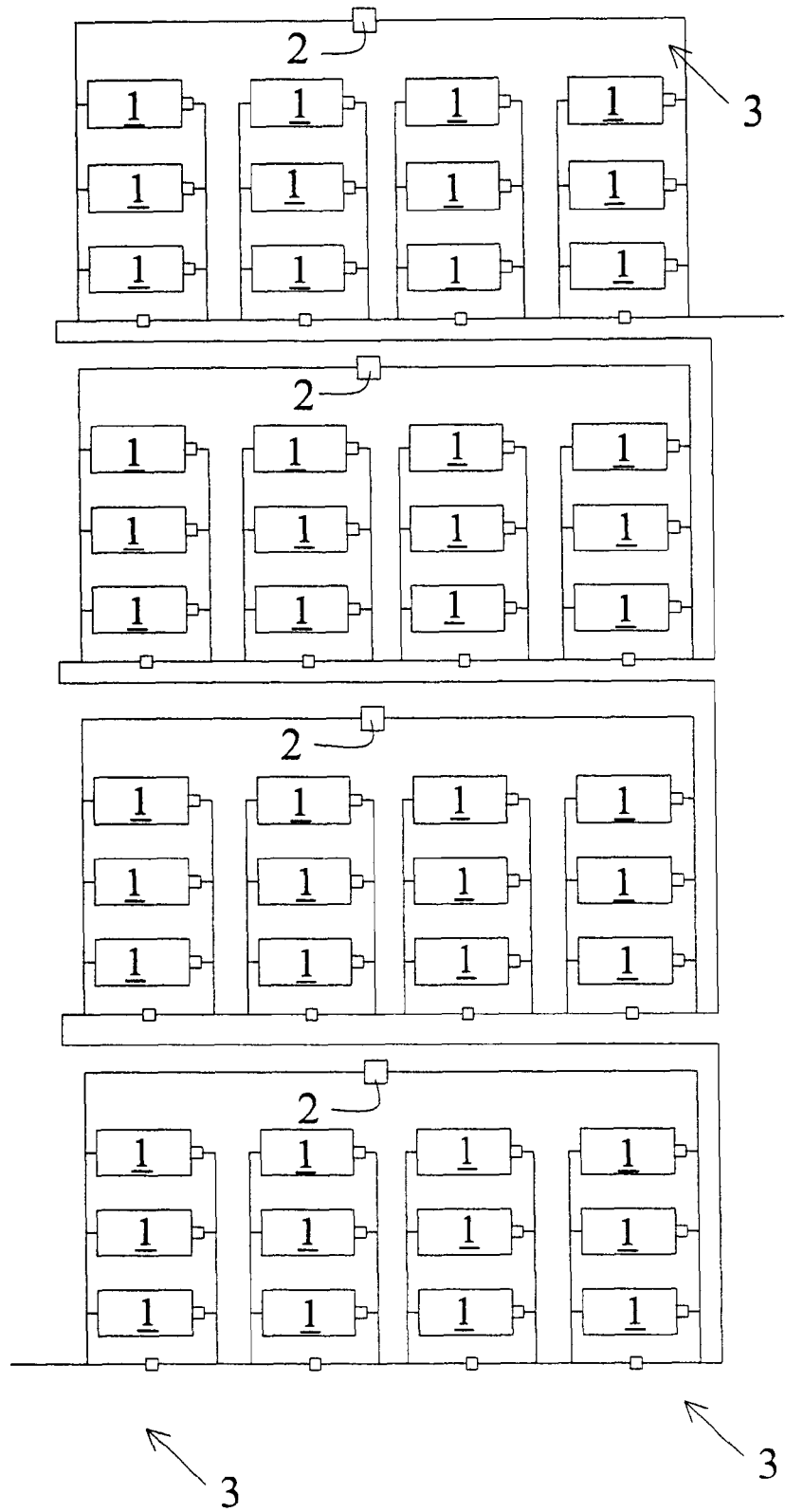
FIG. 10 is a schematic illustration of a battery system having battery assemblies of the invention, as discussed in example 3.

Similar to the case as a battery pack that is comprised of battery sets or battery set assemblies, a battery system is comprised of battery packs or battery pack assemblies. Again, the possible structures of a battery system constructed using battery pack assemblies can be in series, parallel, parallel-series, and series-parallel. An example of a "battery system" is shown in FIG. 10.

One practical case is described here, that is an example of the battery system for an electric motorcycle. Referring to FIG. 10, a typical electric motorcycle uses a battery system having 53V, and 40 Ah. The battery system is comprised of four battery packs (13.3V) connected in series. Each of the battery packs consists of four lithium iron battery sets (3.33V) connected in series. And, each of the battery sets consists of four 10 Ah batteries connected in parallel. In this case, the best structure of the battery system is the utilization of battery pack assemblies and the battery set assemblies, as building blocks for the battery system. In such arrangement, overcharging of battery packs and overcharging of battery sets can be prevented. If the battery system is constructed using battery pack assemblies but the pack assemblies are constructed by battery sets only, some possible overcharging in the battery set may occur after long time cycling. If the battery system is constructed using battery packs only and the battery packs are constructed using battery sets rather than battery set assemblies, cell imbalance accompanied with overcharging during charging can occur.

Example 4

A Preferred Electric Power Supply System

Figure 4:
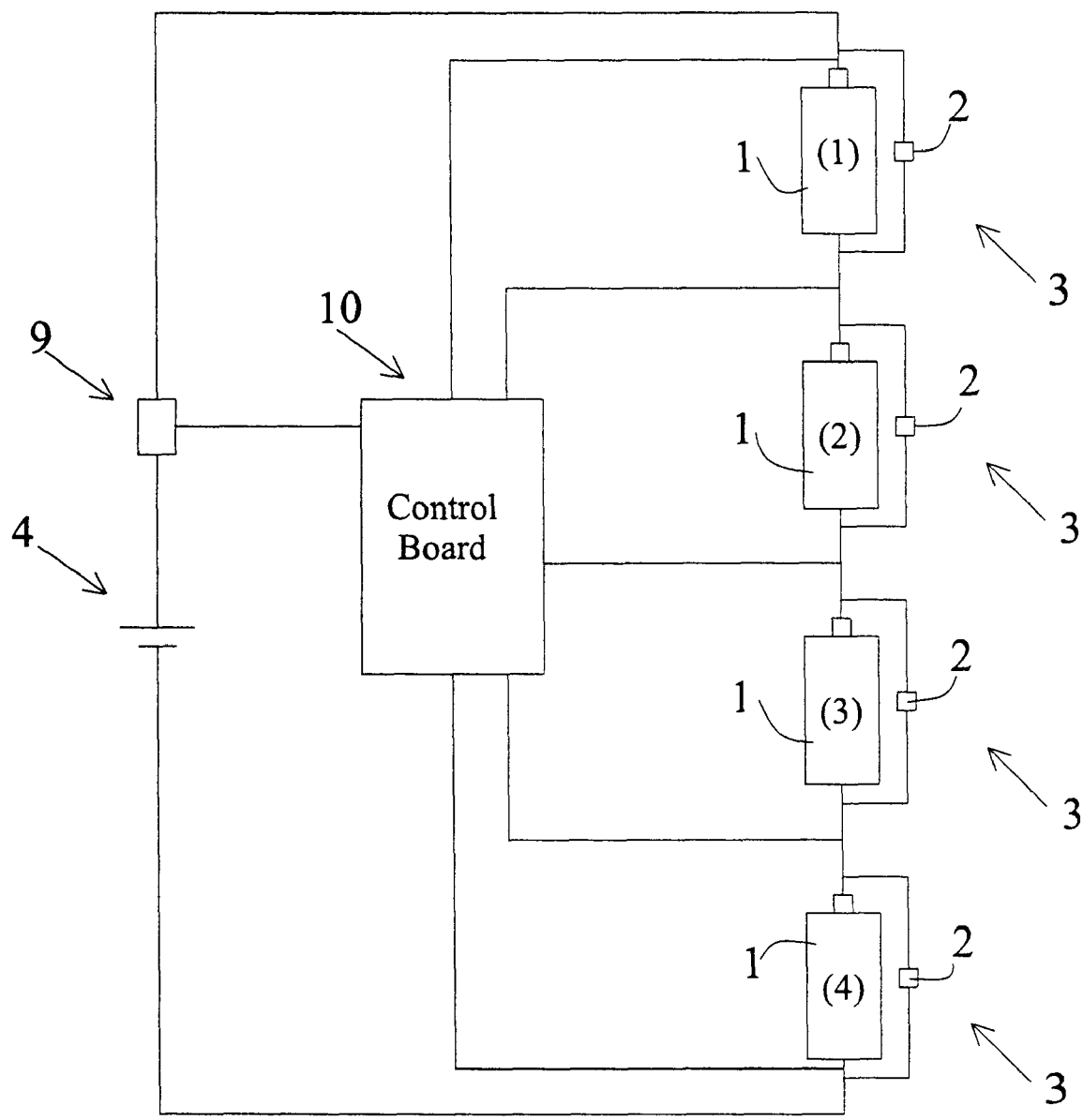
FIG. 4 is a schematic illustration of an electric power supply system having battery assemblies of the invention.
Figure 5A:
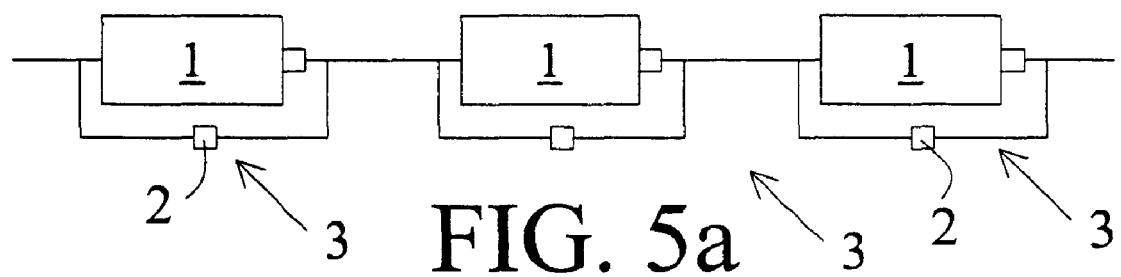
FIGS. 5a-e are schematic illustrations of battery packs having battery assemblies of the invention
Figure 5B:
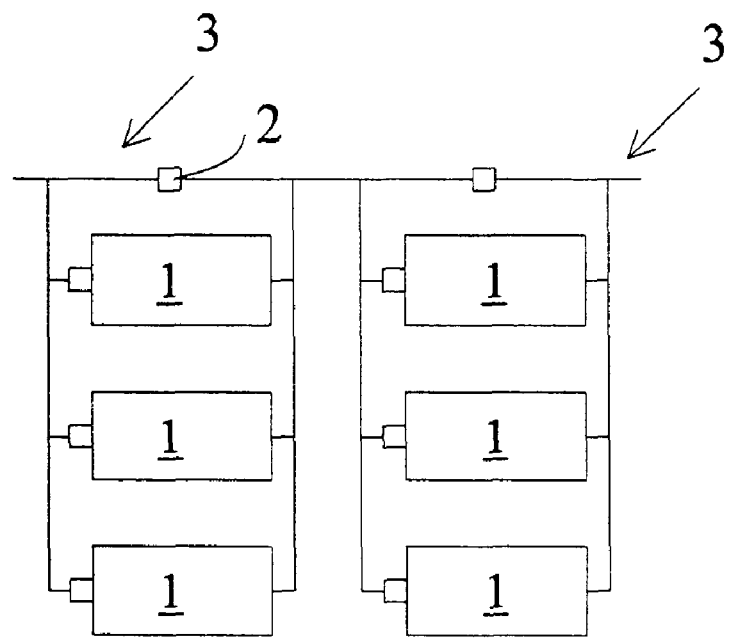
Figure 5C:
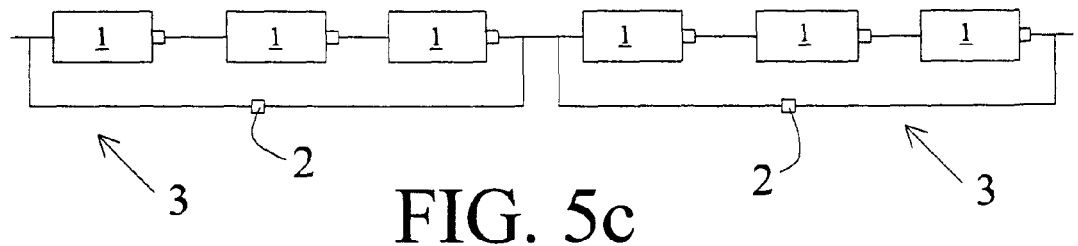
Figure 5D:
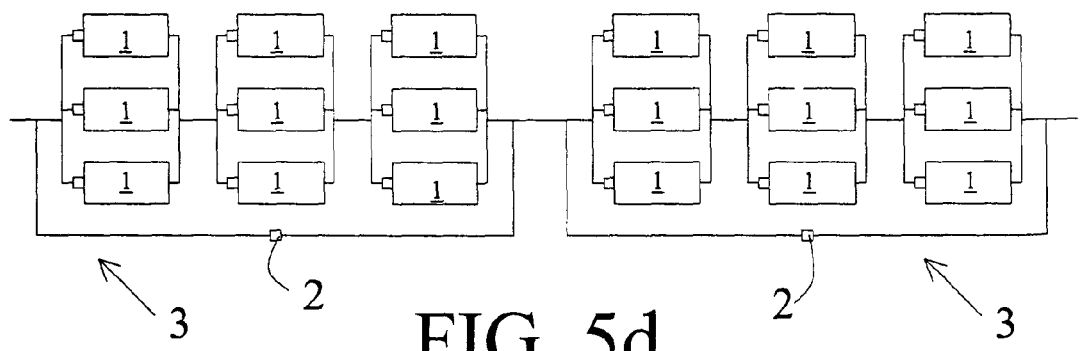
Figure 5E:
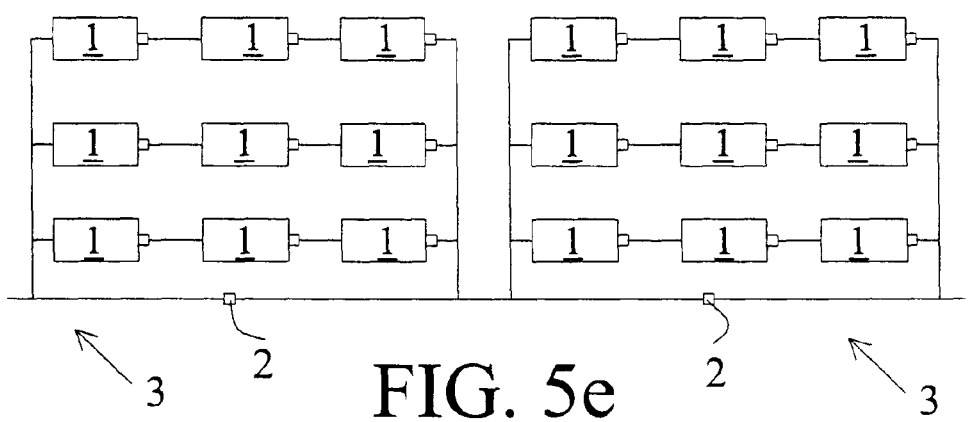
Figure 6A:
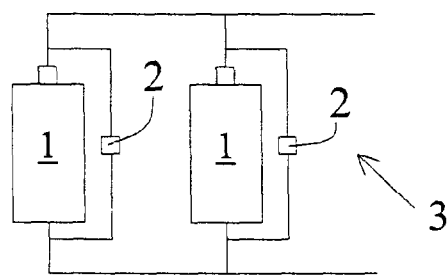
FIGS. 6a-e are schematic illustrations of battery packs having battery assemblies of the invention differing from those of FIGS. 5a-e.
Figure 6B:
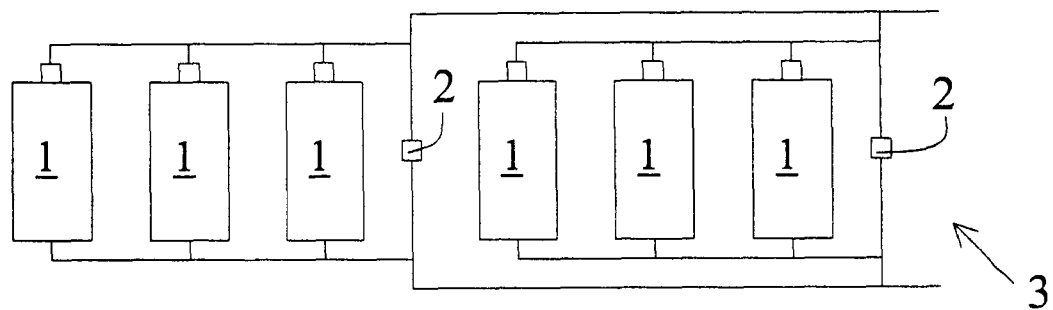
Figure 6C:
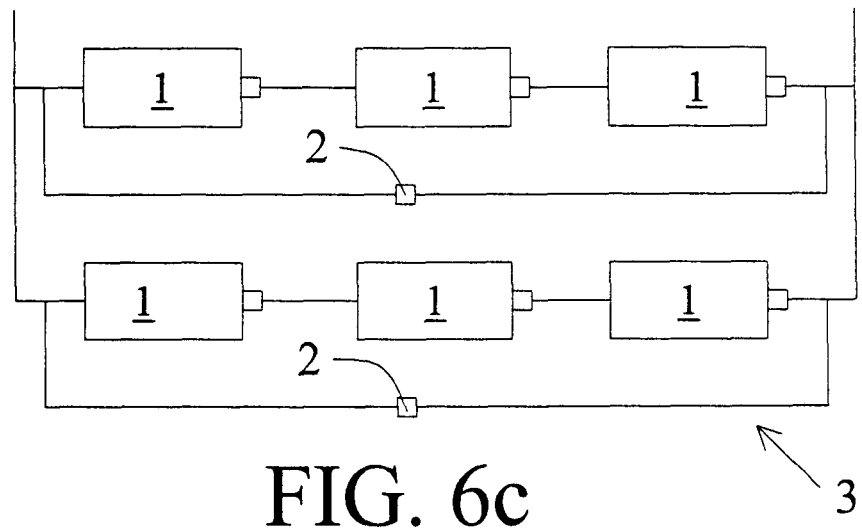
Figure 6D:
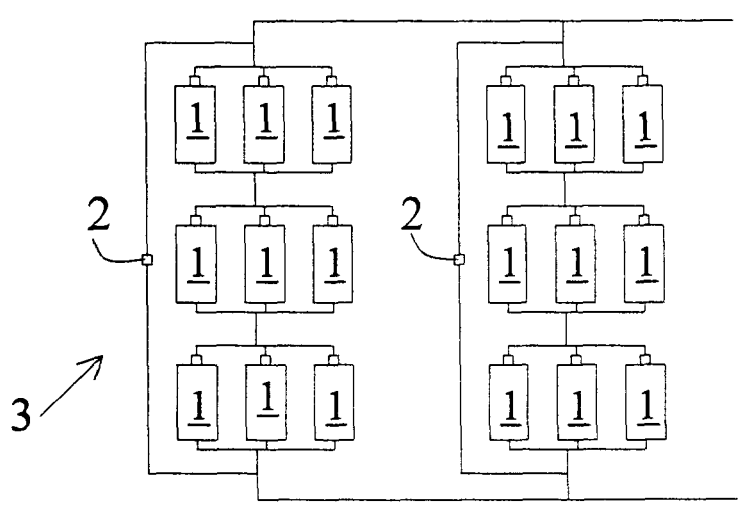
Figure 6E:
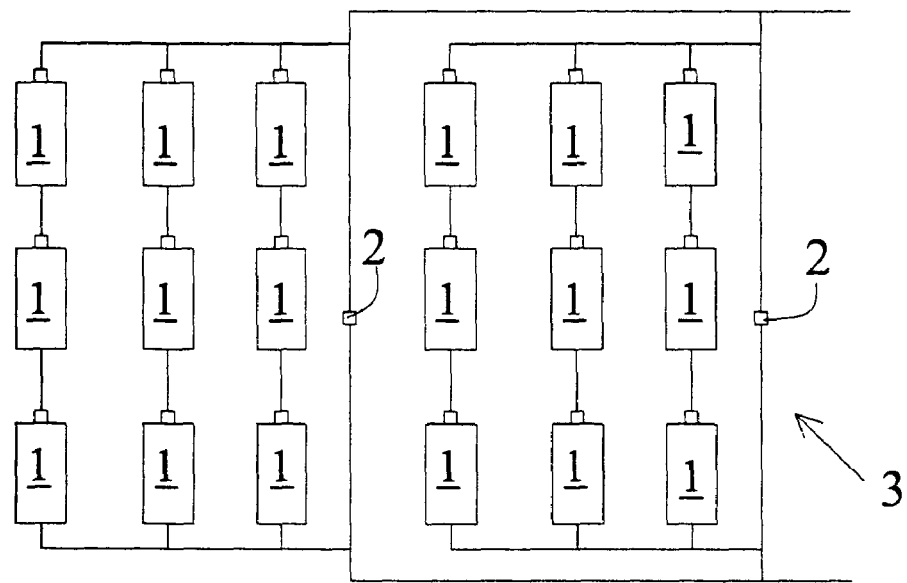
Figure 7A:
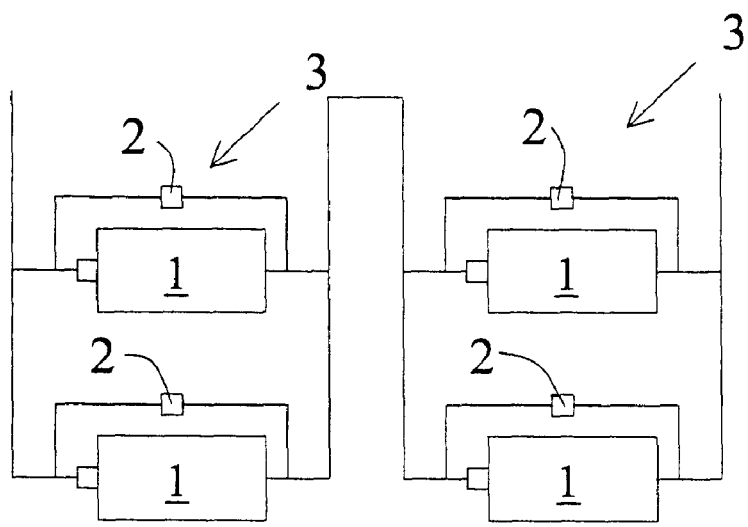
FIGS. 7a-e are schematic illustrations of battery packs having battery assemblies of the invention differing from those of FIGS. 5a-e and 6a-e.
Figure 7B:
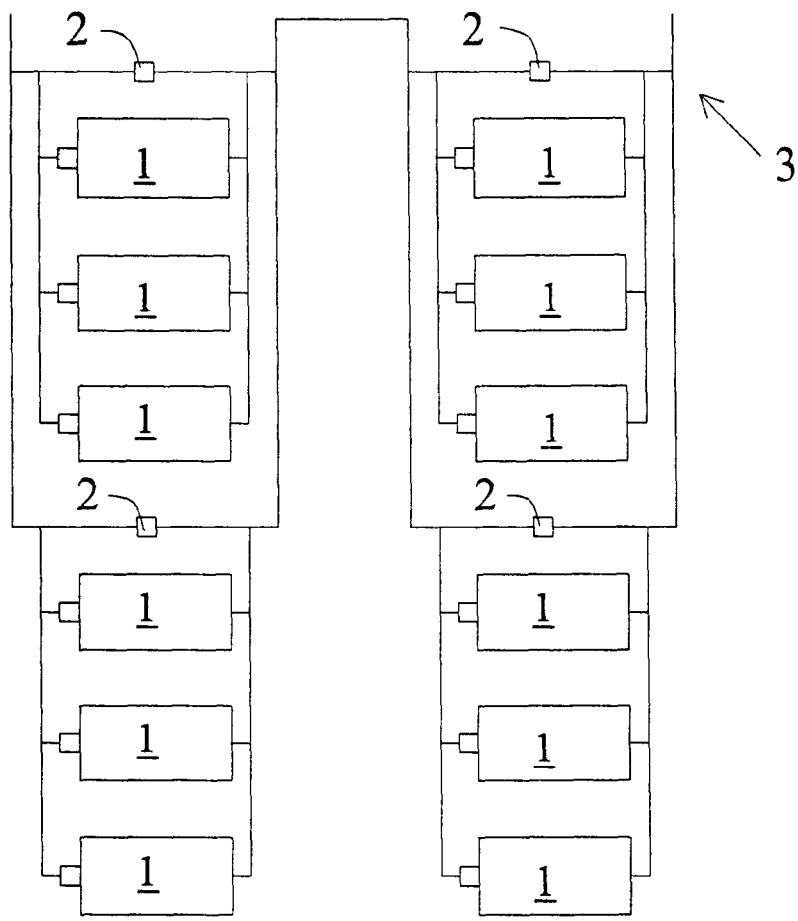
Figure 7C:
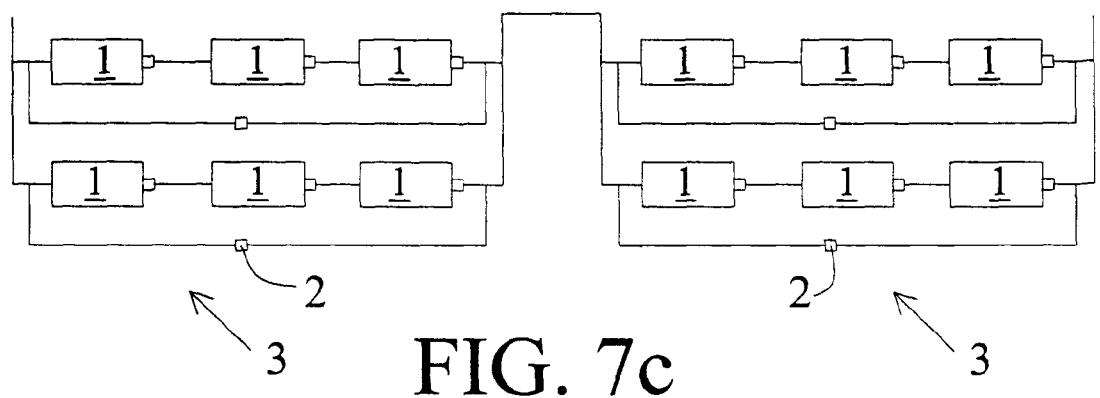
Figures 7D, 7E:
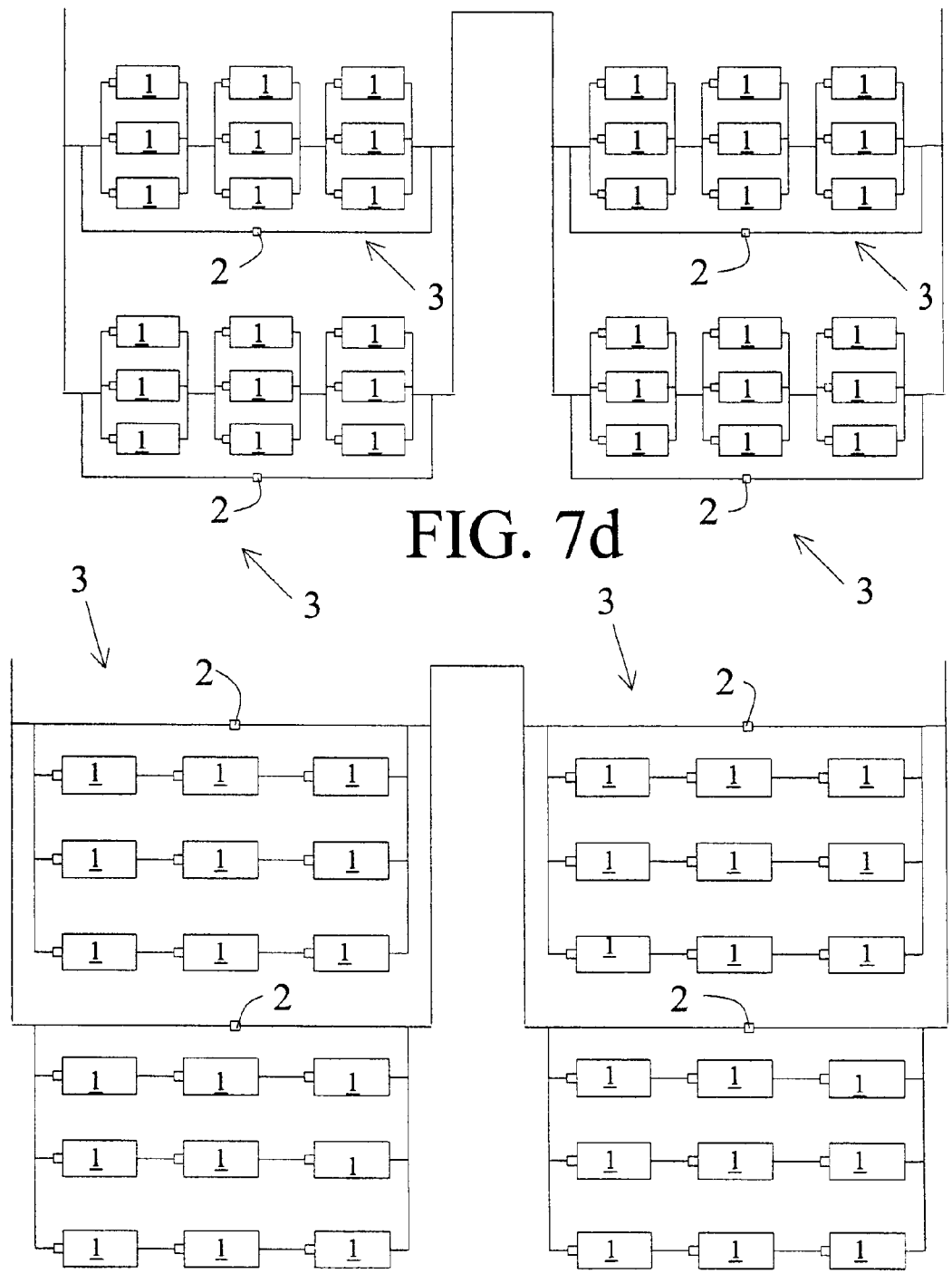
Figure 8A:
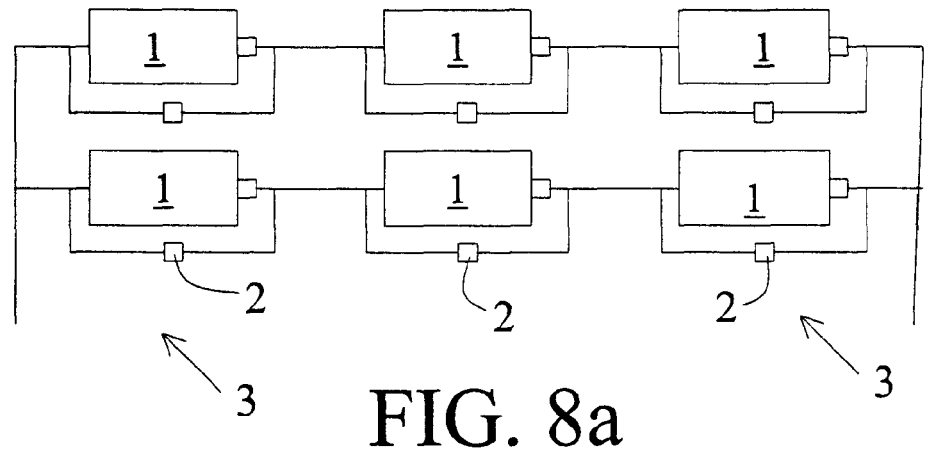
FIGS. 8a-e are schematic illustrations of battery packs having battery assemblies of the invention differing from those of FIGS. 5a-e, 6a-e and 7a-e.
Figure 8B:
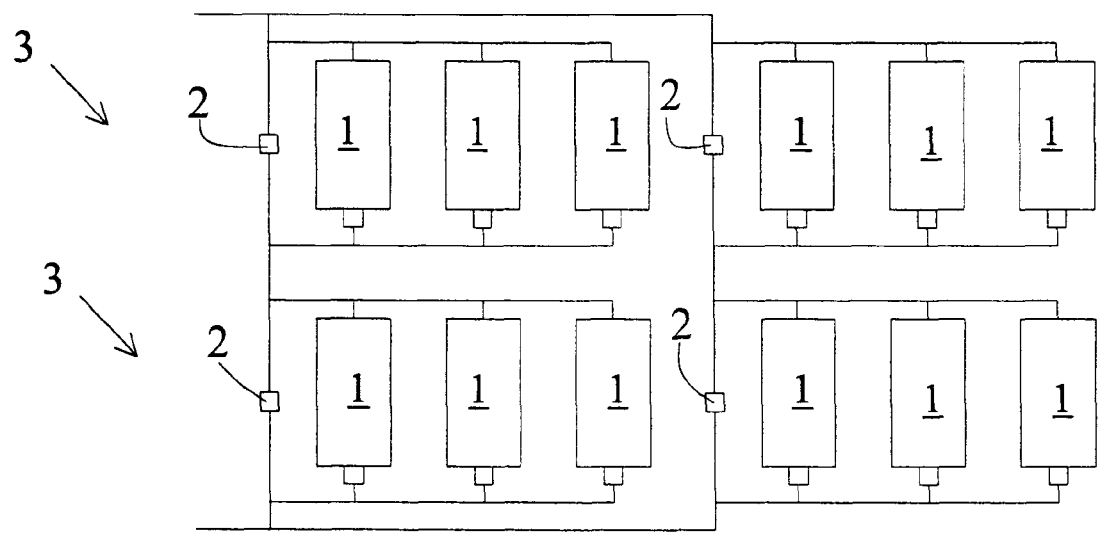
Figure 8C:
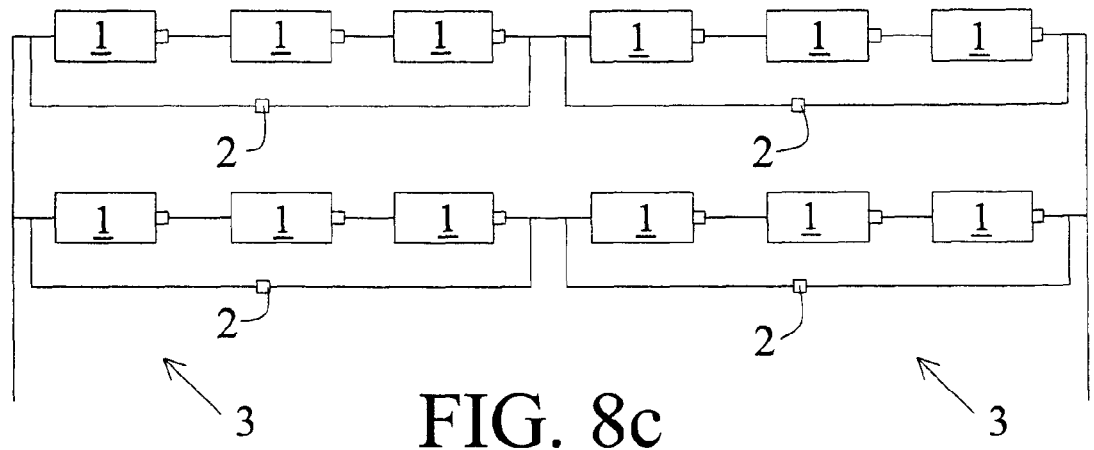
Figure 8D:
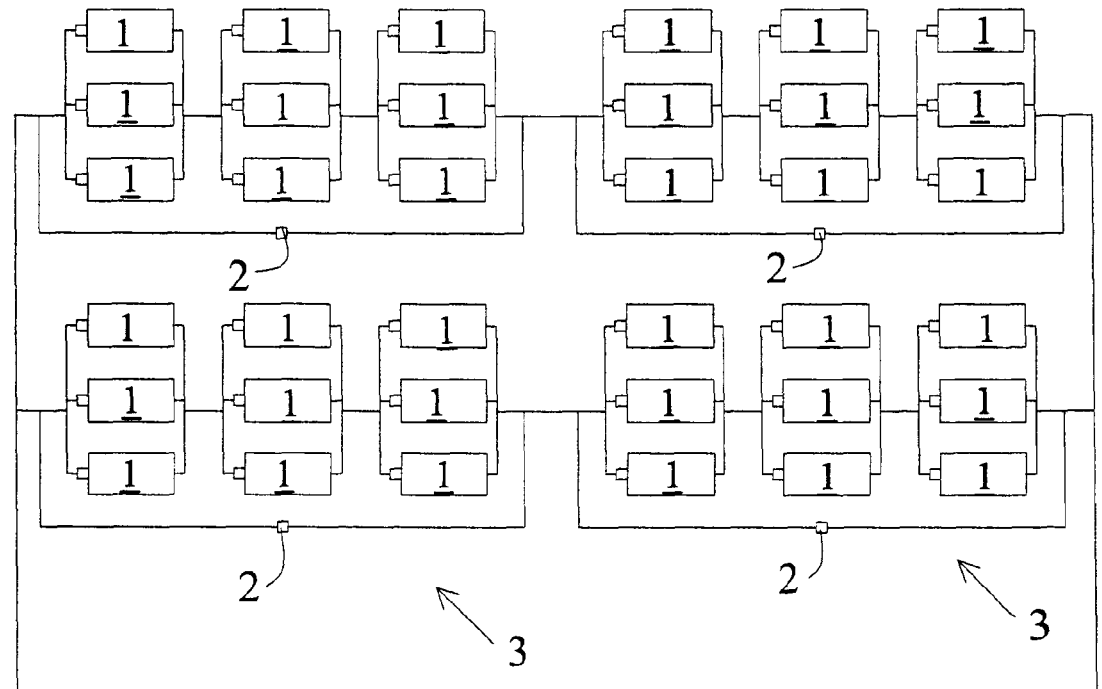
Figure 8E:
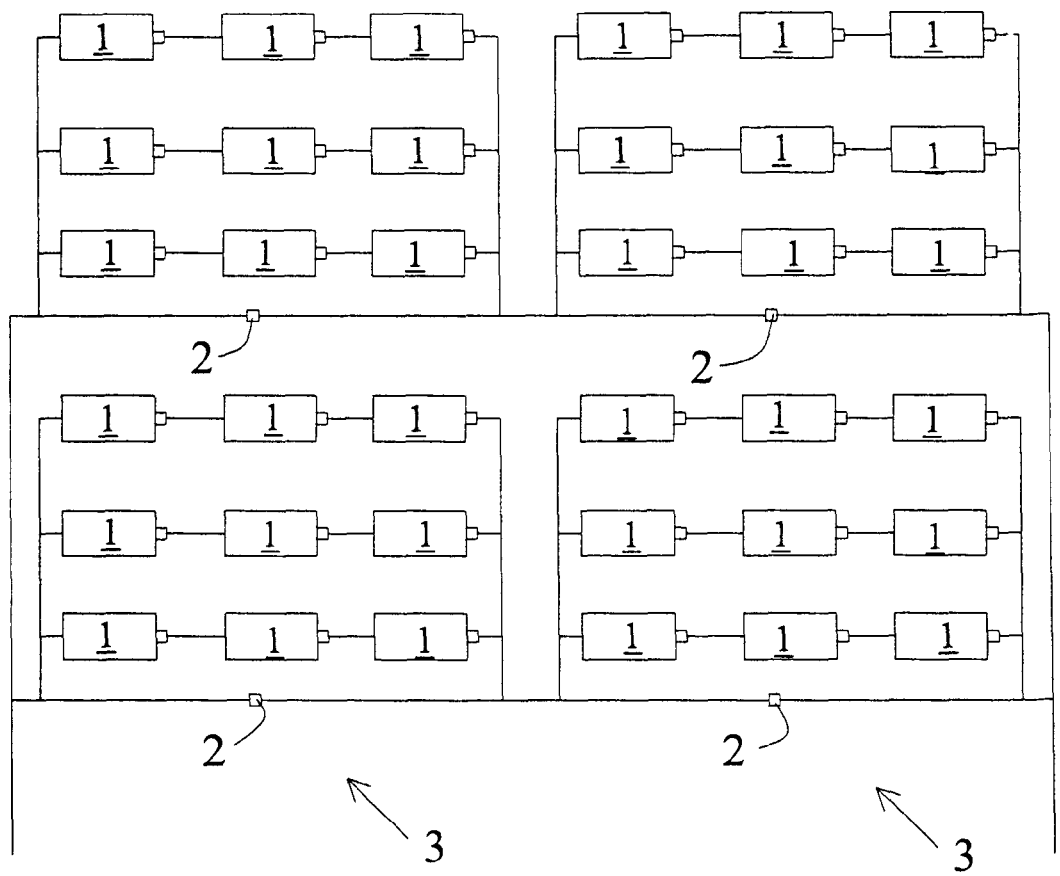

An electric power supply system is the integration of components including a charger 4, a battery system (packs or sets), a control board 10, and a circuit breaker 9, as shown in FIG. 4. Again, four battery assemblies of the invention are connected in series as a simplest example for demonstration. Referring to FIG. 4, it can be seen that each battery is connected in parallel with a circuit consisting of components as shown in FIG. 2(a) or FIG. 2(b). A control board is connected with electrical conductors to each terminal of each of the batteries. Those electrical conductors serve as a means for providing voltage detection. The other end of the control board is connected to a circuit breaker. The charger is connected directly to the two ends of the batteries electrically connected in series. During a normal charging (constant current/constant voltage), if any of the batteries exceeds a preset overcharge voltage, the control board sends a signal to the circuit breaker for charging termination. Similarly, during such discharging, if any of the batteries is below the preset termination voltage, the control board sends a signal to the circuit breaker for discharging termination. These two actions serve as battery protection to avoid overcharging and over discharging. During normal charging, a preset time period is allowed for the charging action (e.g. termination at 1.5 hours after constant voltage charging). At that time, the batteries may be more or less balanced. However, the batteries could be balanced after several chargings, or by just starting a balance charging (small current constant and current charge, current amplitude I<I') mode, to allow constant current charging until all the batteries are balanced.

In the present case, the control board can be a very simple device for detecting the voltages of each battery connected in series and sending signals to the circuit breaker for charging or discharging action termination. The simplicity of the control board is thus benefited by the characteristics of the batteries of the invention since they possess current leakage during charging. In the present invention, the shutting off of the charging is preferably executed by a electromagnetic relay that turns off the power input or output. This electromagnetic relay preferably requires no power consumption during the idle state, and a pulse signal generated by the control board determines the close and open circuit status of the relay and therefore the on and off of the battery charging.

Example 5

Methods to Achieve Cell Equalization as Described in Example 1

Figure 11:
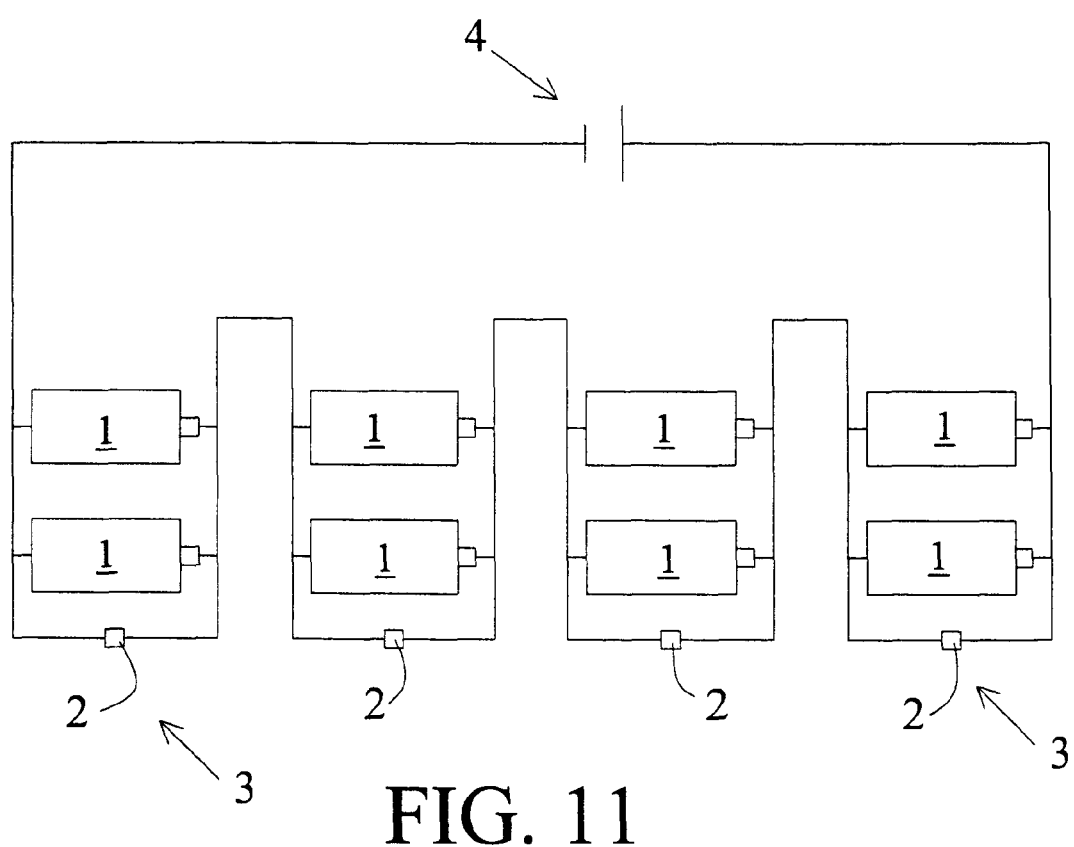
FIG. 11 is a schematic illustration of a battery system having battery assemblies of the invention, as discussed in example 5.

Referring to FIG. 11, in the present example, a total of eight 10 Ah lithium iron batteries are used for demonstrating the charging method and the cell balancing characteristic of the batteries during charging. Two cells are first connected in parallel to form a parallel battery set. Each set of the batteries are then connected with a circuit (a printed circuit board, for example) electrically connected in parallel with the battery set to form a battery assembly. Four battery assemblies are then connected in series. In the present case, the first set, second set, third set, and the fourth set are named for the four battery set assemblies connected in series for clarity. All four set assemblies are first charged to 100% full. The first battery set assembly is then subjected to discharge 10% capacity (2 Ah). After this procedure, all four battery set assemblies are connected in series and this setup is referred to as the battery pack. A preset self-discharge activation voltage is set at 3.75V in the present case. The self-discharge circuit that is parallel to each battery set has a resistance of 2 Ohm. After the above mentioned procedures, the battery pack is subjected to a constant current charge of 1.7 A. The voltage changes versus time for each set of the batteries are shown in Table I. From Table I it can be seen that the $2^{nd}$, $3^{rd}$, and $4^{th}$ battery set assembly had a voltage increase beyond 3.75V in the initial state. 5 minutes after, the $2^{nd}$, $3^{rd}$, and $4^{th}$ battery set assembly came back to be stabilized at 3.75V. At this time, the current passing through the resistor is measured to be 1.8 A.

The $1^{st}$ set of the battery set assembly increases its voltage gradually to 3.75V after 80 minutes and this is the end of the charge balance action. In the present experiment, I (power supply current) is set to be less than I' (current passing resistor). As a result, the voltages for the $2^{nd}$, $3^{rd}$, and $4^{th}$ sets of battery set assemblies were stabilized at 3.75V during charging. Full balances of the four sets of battery set assemblies were achieved after a certain period of time. It was observed that if current I is set to be slightly larger than current I' (1.8 A in this case), and the voltages of the $2^{nd}$, $3^{rd}$, and $4^{th}$ battery sets could be higher than 3.75V during the constant current charge. However, if the constant voltage charge is set at 15V as the second step charging, a voltage decrease of $2^{nd}$, $3^{rd}$, and $4^{th}$ battery sets can be observed (when current I starts decreasing below current I') and the four sets of battery set assemblies can be balanced eventually, but requiring a longer time.

In addition to the self-discharge setup and mechanism described above, there is another feature that can be integrated to the self-discharge setup as shown in FIGS. 2(a) and 2(b) by adding a timer (time counter) or a charge counter that controls the amount of charge being self-discharged under certain conditions. The core idea of adding a timer or a charge counter is to resolve the problem of batteries, battery sets, or battery packs, being connected in series, that can not be charged with prolonged constant voltage charge, that is, when a charger or any means of charging (e.g. solar or wind turbine charging) do not provide long and steady constant voltage charging. In order to make batteries connected in series be balanced, without the presence of prolonged constant voltage charge, the self-discharge setup is provided with a timer. The function of the timer is to set a certain amount of charge in a battery to be self-discharged when certain conditions exist. While batteries are overcharged to a preset voltage V', the self-discharge mechanism is triggered. The self-discharge action continues until the battery voltage goes below the preset voltage V' and then the timer is triggered for further self-discharge for a certain period of time (e.g. 2% of the battery capacity, that is the time required to discharge the battery 2% of it's capacity). Although 2% is given as a preferred amount, a discharge amount of between about 2% and 20% of the battery's capacity is possible in practice of the invention. The advantages of this method include the following: (1) This time delayed self-discharge setup offers the functions described earlier in regard to Example 5, above, that is, when any of the battery set assemblies being connected in series is subjected to self-discharge when the voltage exceeds the preset voltage V', all the battery set assemblies being connected in series will be balanced eventually after prolonged constant voltage charge; (2) Unstable charging conditions, such as renewable energy power source charging (e.g. Solar panels, or wind turbines . . . etc.), or any other type of chargers that do not offer prolonged constant voltage charging will still be useful for charging the batteries while maintaining the performance (function) of battery cell balance. This can be realized using the same battery set assemblies described in Example 5 above, as an example, that is charged to a certain voltage and a cut-off is performed without constant voltage charging. The battery set assemblies being connected in series that have already exceeded the preset voltage limit V' will be kept discharging and a further self-discharge will be performed even when the battery voltage drops down below the preset voltage V'. Owing to an additional self-discharge performed to those battery set assemblies already exceeding the preset voltage V', the capacity difference between those exceeding V' before cut-off (with self-discharge triggered) and those below V' before cut-off (without self-discharge being triggered) will be closer in capacity if the time utilized for constant voltage charge is insufficient; and (3) The constant voltage charging can be replaced by several voltage cut-off charging methods, as will be discussed in more detail in Example 6, below.

Example 6

Method to Achieve Battery Cell Equalization without Prolonged Constant Voltage Charging The purpose of the present example is to demonstrate the need for the time delayed function of the invention for the self-discharge setup that achieves a battery cell balance condition without having a prolonged time for constant voltage charging.

Figure 12:
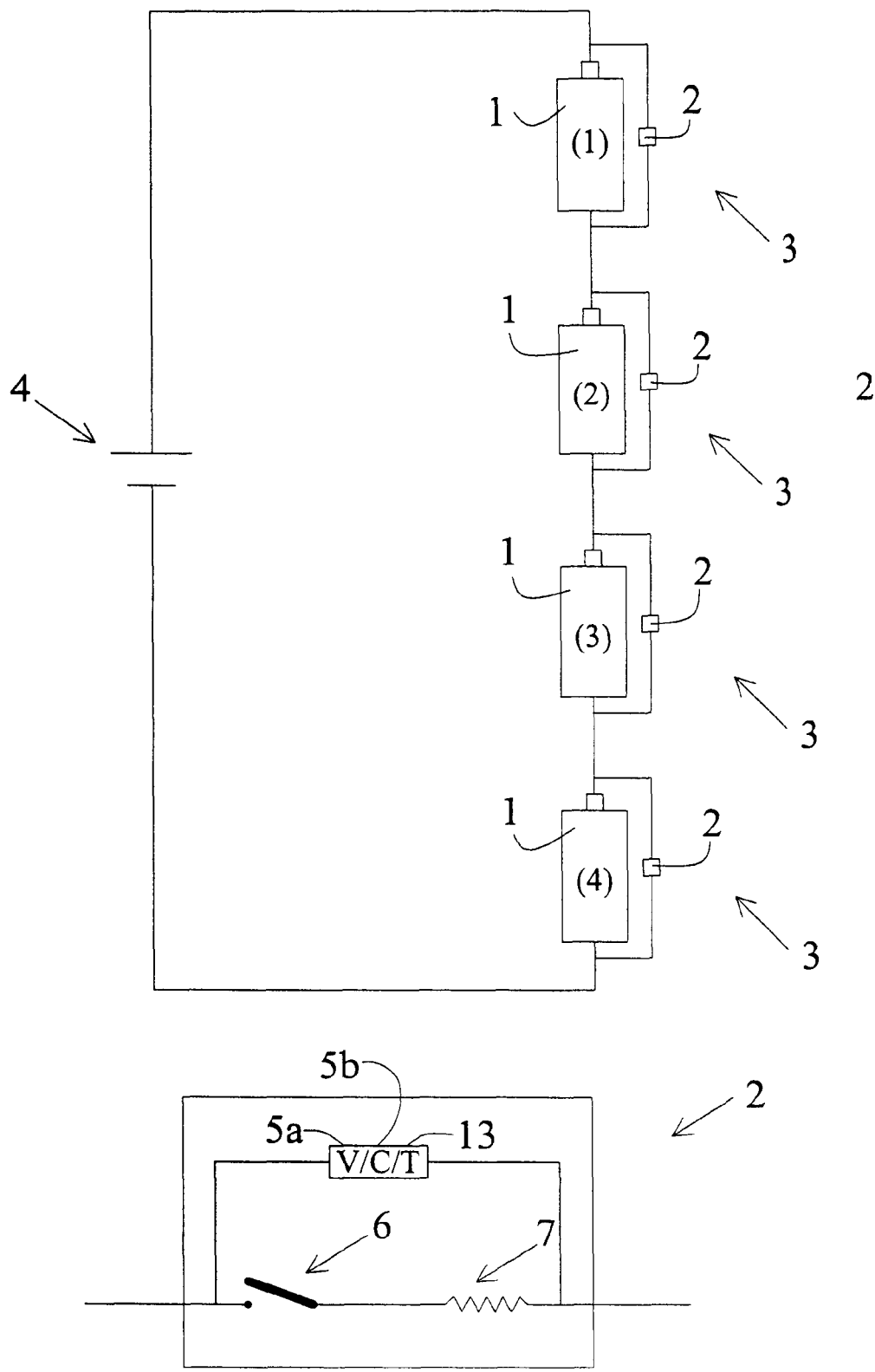
FIG. 12 is a schematic illustration of a battery system having battery assemblies of the invention, as discussed in example 6.
Figure 13A:
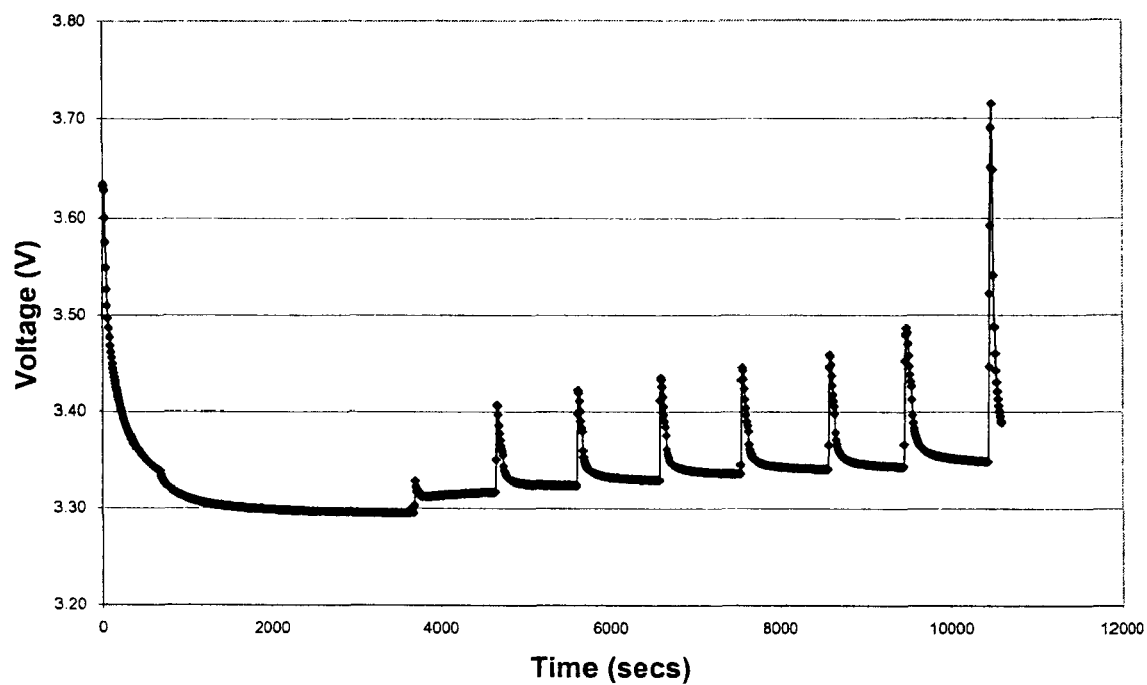
FIGS. 13(a)-(e) show experimental results for Example 6.
Figure 13B:
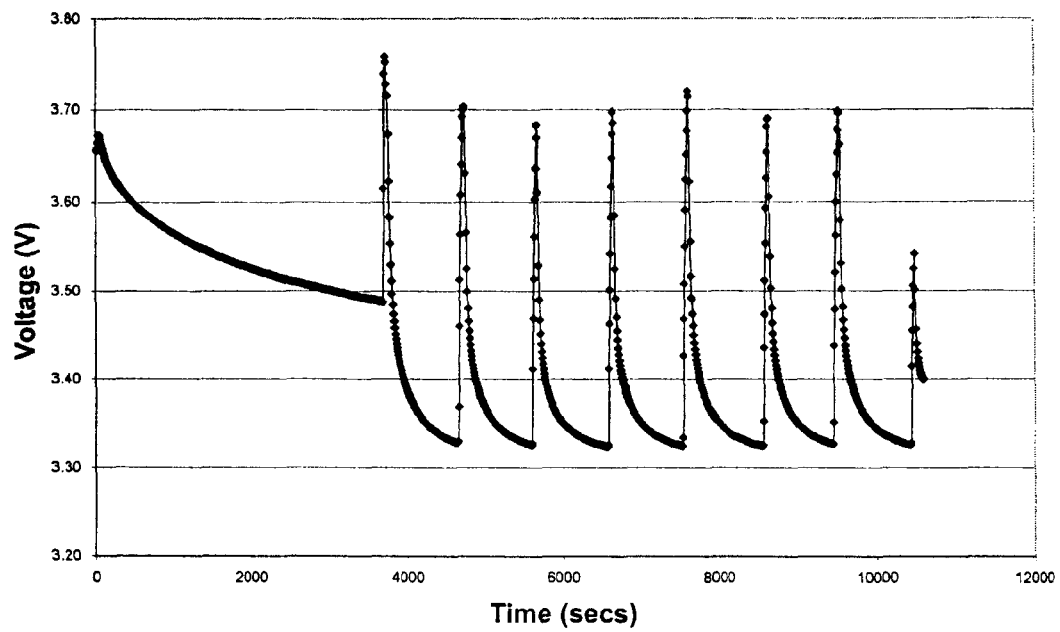
Figure 13C:
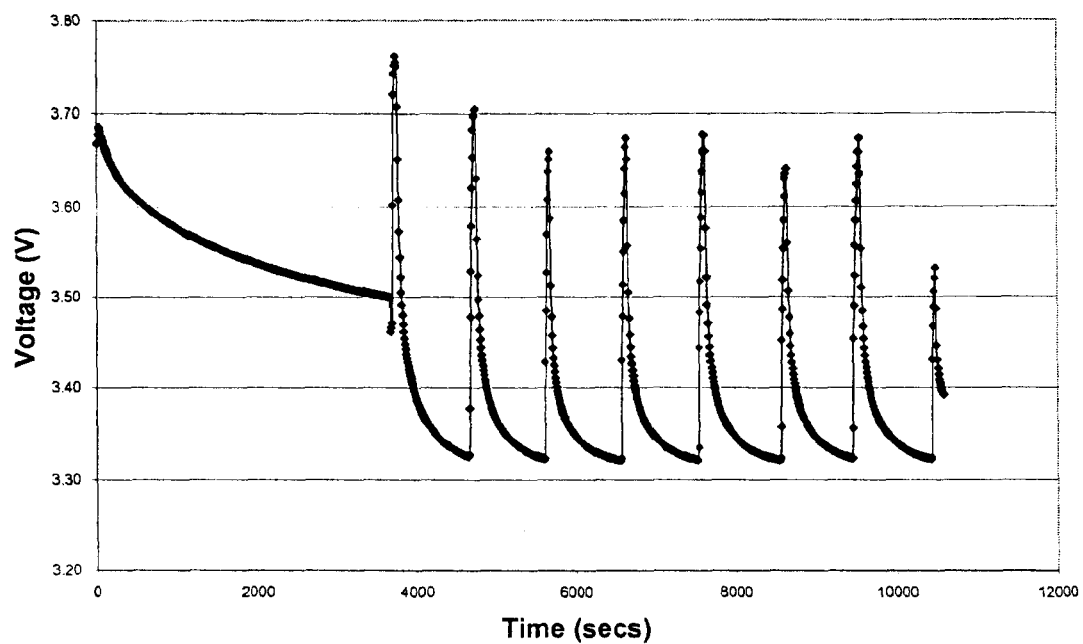
Figure 13D:
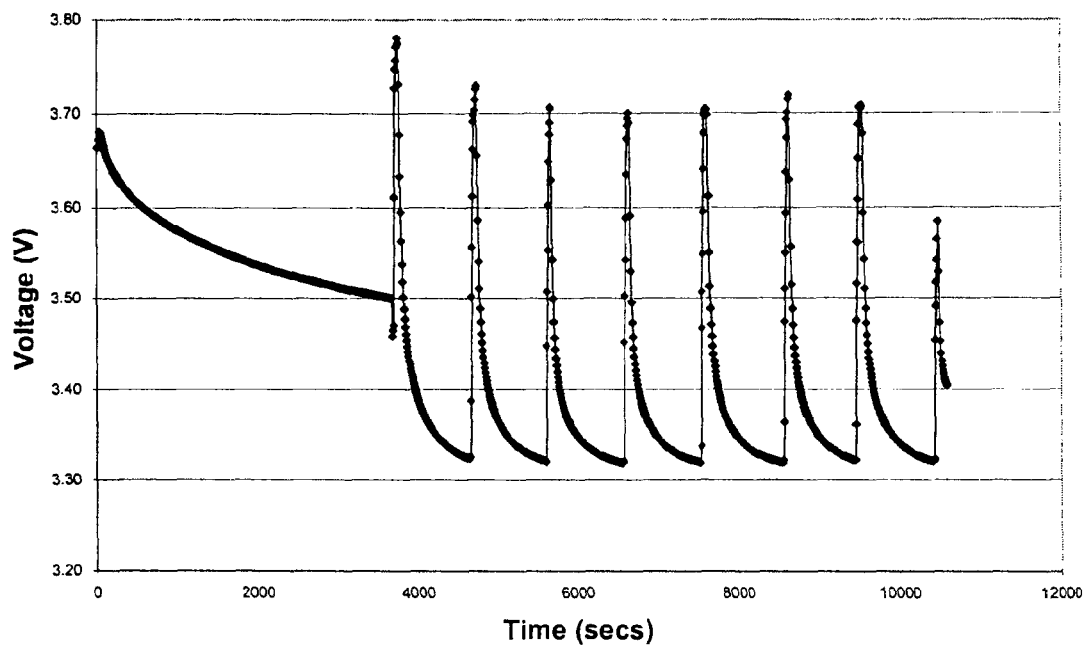
Figure 13E:
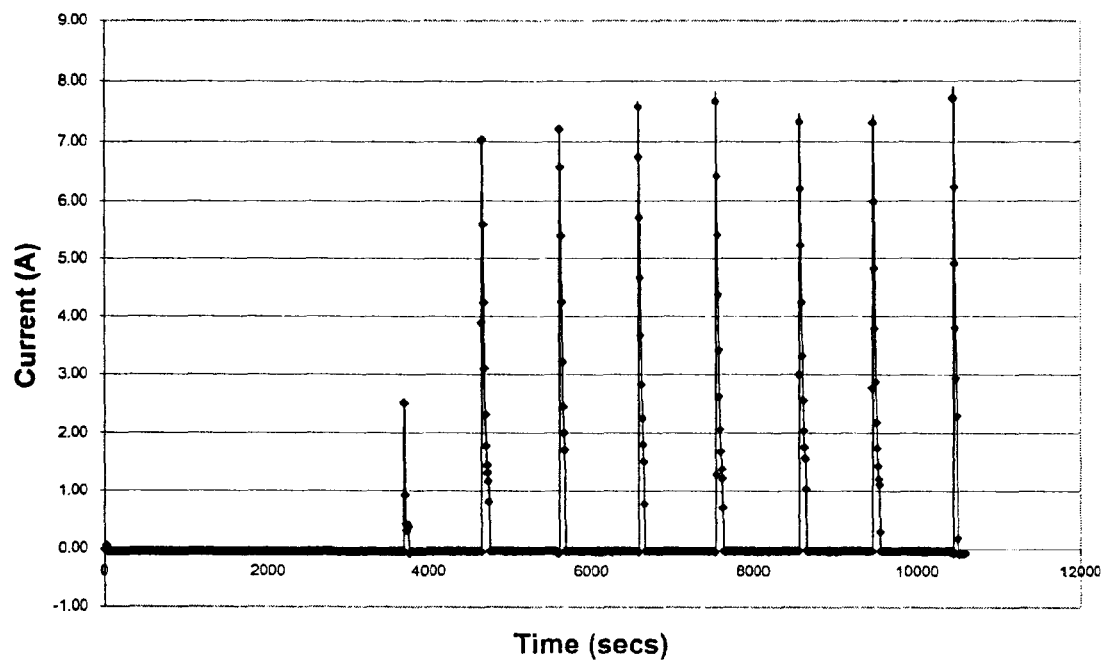

Referring to FIG. 12, in the present example a total of four 10 Ah lithium iron batteries are used for demonstrating the charging method and the cell balancing characteristic of the batteries during charging. Each battery 1 is connected with a circuit 2 electrically connected in parallel with the battery to form a battery assembly 3. Each circuit 2 contains a voltage detector 5a, a 10 Ohm resistor 7, and a timer 13, that allows self-discharge of the battery when the battery voltage exceeds or is equal to 3.65V, followed by a further self-discharge for a time period of 15 minutes when the battery voltage goes below 3.65V. Four battery assemblies are connected in series. In the present example the 4 battery assemblies in FIG. 12 have batteries numbered (1), (2), (3), and (4). The voltage changes versus time for each battery assembly are shown from FIGS. 13(a) to 13(d). The current versus time for the battery pack, which contains the four battery assemblies in series, is shown in FIG. 13(e). All four battery assemblies are first charged to 100% of capacity and balanced initially (3.65V±0.03V), as can be seen from FIGS. 13(a) to 13(d). The first battery assembly (battery (1)) is then subjected to discharge 6.6% capacity (0.66 Ah) using a 5 Ohm resistor for one hour. After this procedure, the battery pack that contains the four battery assemblies connected in series is subjected to a constant voltage charge set at 14.7V. However, the charger is set to cut-off when any of the battery assembly is charged above 3.70V. It can be seen from FIGS. 13(a) to 13(d) that the $2^{nd}$, $3^{rd}$, and the $4^{th}$ battery assemblies (batteries (2), (3), and (4)) increases rapidly in voltage as soon as the charger starts charging. The charger stops charging almost immediately after it is activated. However, since the $2^{nd}$, $3^{rd}$, and the $4^{th}$ battery assemblies triggered the self-discharge voltage preset at 3.65V, a continuous drop in voltage is observed for each of them, even after the cut-off of the charger. In comparison to the $2^{nd}$, $3^{rd}$, and the $4^{th}$ battery assemblies, the $1^{st}$ battery assembly does not have any self-discharge after the cut-off of the charger thus a flatter voltage profile is observed. After 8 cycles of charging it is observed that the $1^{st}$ battery assembly becomes the only one that performs self-discharge (increase over 3.65V in voltage) and cut-off of the charging process when it exceeds 3.70V. This result suggests cell balance can be achieved with multiple charging by setting voltage as a cut-off. A recovery of 6.6% battery capacity difference can be compensated for with multiple charging steps with the utilization of the time delayed self-discharge setup for each of the batteries. With a further charging of the four batteries in series at 14.7V with the removal of self-discharge setup on each battery, an overall capacity input of 3.7% to 0 current is obtained. This implies that all the batteries are close to being fully charged after 8 consecutive chargings, even without the presence of prolonged constant voltage charging. According to the experimental results shown, there is no rigid limitation of what components are used for the time-delayed self-discharge mechanism. Any integrated circuits, transistors, or even setups integrating components including voltage sensor, resistor, and timer or charge counter manually can achieve the goal of balancing the batteries connected in series without prolonged constant voltage charging.

Although Example 6 is for four battery assemblies connected in series as shown in FIG. 12, the method of the invention applies to batteries arranged as shown in FIGS. 5(a)-11, and expanded versions of those arrangements.

TABLE I

Voltage versus time for each set of the batteries.
40138 12 V 20 Ah Lithium Iron Cell Balance
Charging Test
Constant current charge (current = 1.7 A)

| | Set Number | | | |
|---|---|---|---|---|
| | 1 | 2 | 3 | 4 |
| | Initial Voltage (V) | | | |
| | 3.344 | 3.354 | 3.348 | 3.35 |
| Time (minutes) | Voltage for each set (V) | | | |
| 0 | 3.401 | 3.883 | 3.852 | 3.861 |
| 5 | 3.457 | 3.761 | 3.757 | 3.759 |
| 10 | 3.462 | 3.752 | 3.761 | 3.762 |
| 15 | 3.473 | 3.753 | 3.755 | 3.757 |
| 20 | 3.481 | 3.756 | 3.751 | 3.754 |
| 30 | 3.499 | 3.759 | 3.752 | 3.757 |
| 40 | 3.558 | 3.753 | 3.756 | 3.755 |
| 50 | 3.633 | 3.758 | 3.754 | 3.756 |
| 60 | 3.757 | 3.751 | 3.753 | 3.754 |

TABLE I-continued

Voltage versus time for each set of the batteries.
40138 12 V 20 Ah Lithium Iron Cell Balance
Charging Test
Constant current charge (current = 1.7 A)

| Time (minutes) | Set Number | | | |
|---|---|---|---|---|
| | 1 | 2 | 3 | 4 |
| | Initial Voltage (V) | | | |
| | 3.344 | 3.354 | 3.348 | 3.35 |
| | Voltage for each set (V) | | | |
| 70 | 3.752 | 3.757 | 3.756 | 3.752 |
| 80 | 3.759 | 3.751 | 3.754 | 3.755 |

The invention claimed is:

1. A method for charging a plurality of rechargeable battery set assemblies electrically connected in series with a battery charger, each battery set assembly having a battery set with a means for self-discharging same electrically connected in parallel therewith, said battery set being selected from a battery parallel set having a plurality of batteries electrically connected in parallel to form the battery parallel set, a battery series set having a plurality of batteries electrically connected in series to form the battery series set and a battery parallel-series set having a plurality of said battery parallel sets electrically connected in series to form the battery parallel-series set, said method comprising:
   continually determining a voltage across each battery parallel set, then
   if the voltage is > a preset value, self-discharge the battery parallel set until the voltage is equal to the preset voltage, then
   further self-discharge the battery parallel set for a period of time (t), wherein time (t) provides a discharge of the battery parallel set charge corresponding to a preset percentage of the battery parallel set's charge capacity, wherein the preset percentage of the battery's capacity being further discharged when voltage goes below the preset voltage is in the range of 0.1% to 20%.

2. The method for charging of claim 1, further including providing at least one integrated circuit for controlling the self-discharging of the batteries.

3. The method for charging of claim 2, wherein the at least one integrated circuit performs functions of voltage detection and time control for monitoring the conditions for self-discharging.

* * * * *